US007890535B2

(12) United States Patent
Matsuno

(10) Patent No.: US 7,890,535 B2
(45) Date of Patent: Feb. 15, 2011

(54) MANAGEMENT OF PROCESSES BASED ON REFERENCE INFORMATION

(75) Inventor: Yoichiro Matsuno, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 942 days.

(21) Appl. No.: 11/067,758

(22) Filed: Mar. 1, 2005

(65) Prior Publication Data
US 2005/0198025 A1   Sep. 8, 2005

(30) Foreign Application Priority Data

| Mar. 1, 2004 | (JP) | ............................. 2004-056516 |
| Feb. 28, 2005 | (JP) | ............................. 2005-054523 |

(51) Int. Cl.
*G06F 17/00* (2006.01)
*G06F 7/00* (2006.01)
(52) U.S. Cl. ......................... 707/793; 707/803; 705/301
(58) Field of Classification Search ........................ None
See application file for complete search history.

(56) References Cited

U.S. PATENT DOCUMENTS

| 5,790,853 | A  | * | 8/1998  | Nomura et al. ............. 718/104 |
| 5,960,404 | A  | * | 9/1999  | Chaar et al. ...................... 705/8 |
| 6,725,428 | B1 | * | 4/2004  | Pareschi et al. ............. 715/205 |
| 7,065,493 | B1 | * | 6/2006  | Homsi ........................... 705/8 |
| 7,069,179 | B2 | * | 6/2006  | Kim et al. .................... 702/182 |
| 7,403,948 | B2 | * | 7/2008  | Ghoneimy et al. ............ 707/10 |
| 2002/0184250 | A1 | * | 12/2002 | Kern et al. .................. 707/204 |
| 2002/0186254 | A1 | * | 12/2002 | Monbaron ................. 345/810 |
| 2002/0188597 | A1 | * | 12/2002 | Kern et al. ..................... 707/1 |
| 2004/0078373 | A1 | * | 4/2004  | Ghoneimy et al. ............ 707/10 |
| 2005/0015711 | A1 | * | 1/2005  | Yamamoto et al. ........... 715/500 |
| 2005/0093881 | A1 | * | 5/2005  | Okita et al. .................. 345/589 |
| 2005/0257136 | A1 | * | 11/2005 | Charisius et al. ............. 715/511 |
| 2007/0033080 | A1 | * | 2/2007  | Hochberg et al. ............... 705/7 |
| 2007/0129976 | A1 | * | 6/2007  | Hochberg et al. ............... 705/7 |

FOREIGN PATENT DOCUMENTS

JP       H08-249357       9/1996

(Continued)

OTHER PUBLICATIONS

Ott, M. "Conceptual Design and Implementation of a Graphical Workflow-Modelling Editor in the Context of Distributed Groupware-Databases", Masters Thesis, University of Paderborn, Department of Information Management, May 1994.*

(Continued)

*Primary Examiner*—Luke S Wassum
(74) *Attorney, Agent, or Firm*—Oblon, Spivak, McClelland, Maier & Neustadt, L.L.P.

(57) ABSTRACT

An apparatus for managing one or more processes includes a reference relation information managing unit configured to manage information about reference relations between the one or more processes, one or more activities constituting the one or more processes, and one or more documents relating to at least one of the one or more processes and the one or more activities, or about reference relations between the one or more processes, the one or more activities, and one or more participants relating to at least one of the one or more processes and the one or more activities.

18 Claims, 43 Drawing Sheets

FOREIGN PATENT DOCUMENTS

| | | |
|---|---|---|
| JP | 11-073459 | 3/1999 |
| JP | 2000-215244 | 8/2000 |
| JP | 2001-014389 | 1/2001 |
| JP | 2003-256627 | 9/2003 |

OTHER PUBLICATIONS

Tagg, R.M. "Workflow Support Across Organisational Boundaries", Proceedings of the Information Systems Conference of New Zealand, Oct. 30-31, 1996, pp. 32-42.*

Action Technologies "ActionWorkflow Enterprise Series 3.0 Process Builder User's Guide", Part No. MB200-0396, 1996.*

Kammer, P.J., G.A. Bolcer, R.N. Taylor and A.S. Hitomi "Supporting Distributed Workflow Using HTTP", Proceedings of the 5$^{th}$ International Conference on the Software Process, Jun. 1998, pp. 83-94.*

Tagg, R. and W. Lelatanavit "Using an Active DBMS to Implement a Workflow Engine", Proceedings of the 1998 International Data Engineering and Applications Symposium (IDEAS'98), Jul. 8-10, 1998, pp. 286-295.*

Template Software "Using the WFT Development Environment", 1998.*

Tao, F. et al. "Towards the Semantic Grid: Enriching Content for Management and Reuse", Journal of Universal Computer Science, vol. 9, No. 6, Jun. 2003.*

Hae, H. and Y. Kim "A Document-Process Association Model for Workflow Management", Computers in Industry, vol. 47, 2002, pp. 139-154.*

Dustdar, S. "Caramba—A Process-Aware Collaboration System Supporting Ad hoc and Collaborative Processes in Virtual Teams", Distributed and Parallel Databases, vol. 15, Jan. 2004, pp. 45-66.*

Dustdar, S. "Reconciling Knowledge Management and Workflow Management Systems: The Activity-Based Knowledge Management Approach", Journal of Universal Computer Science, vol. 11, No. 4, 2005, pp. 589-604.*

Dustdar, S. "Collaborative Knowledge Flow—Improving Process-Awareness and Traceability of Work Activities", Proceedings of the Conference on Practical Aspects of Knowledge Management (PAKM), LNAI 2569, 2002, pp. 389-397.*

U.S. Appl. No. 11/558,685, filed Nov. 10, 2006, Matsuno.

Haruo Hayami, "Workflow Management System Having Advanced This Far (1)", Information Processing Society of Japan Magazine, vol. 39, No. 11, Nov. 1998, pp. 1160-1165.

Haruo Hayami, "Workflow Management System Having Advanced This Far (2)", Information Processing Society of Japan Magazine, vol. 39, No. 12, Dec. 1998, pp. 1258-1263.

Haruo Hayami et al., "Workflow Management System Having Advanced This Far (3)", Information Processing Society of Japan Magazine, vol. 40, No. 5, May 1999, pp. 507-513.

Office Action issued Oct. 5, 2010, in Japanese Patent Application No. JP2005-054523, filed Sep. 29, 2010.

* cited by examiner

FIG.16

| ID | From | To |
|---|---|---|
| 1 | http://docflow/processid2/activityid1 | http://repositroy?did=1 |
| 2 | http://docflow/processid1 | http://repositroy?did=2 |
| 3 | http://docflow/processid1/activityid3 | http://repositroy?did=1 |
| 4 | http://repositroy?did=1 | UserId=A |
| 5 | http://docflow/processid1/activityid3 | UserId=B |
| 6 | http://docflow/processid1/activityid4 | File://c/hogehoge |

PROCESS ID
ACTIVITY ID
DOCUMENT ID
USER ID

FIG.18

☐ORGANIZATION ☑ACTIVITY ☐PROCESS ☐DOCUMENT    SEARCH ALSO IN SUB-FLOW    [SEARCH BUTTON]
☐Yes ☑No

─── PROCESS SEARCH ───

START DATE [____]    COMPLETION DATE [____]

NAME [____]    INCLUSIVE / IDENTICAL    ☐ORGANIZATION ☐DOCUMENT ☐ACTIVITY INCLUDED

PARTICIPANT [____]    INCLUSIVE / IDENTICAL

─── ACTIVITY SEARCH ───

START DATE [____]    COMPLETION DATE [____]

NAME [____]    INCLUSIVE / IDENTICAL    INCLUDED IN ☐PROCESS    ☐ORGANIZATION ☐DOCUMENT ☐PROCESS INCLUDED

PARTICIPANT [____]    INCLUSIVE / IDENTICAL

─── DOCUMENT SEARCH ───

CREATION DATE [____]    UPDATE DATE [____]

DOCUMENT PROPERTY NAME [____]    INCLUSIVE / IDENTICAL    INCLUDED IN ☑ACTIVITY ☑PROCESS    ☐ORGANIZATION INCLUDED

DOCUMENT PROPERTY VALUE [____]    INCLUSIVE / IDENTICAL

FULL-TEXT SEARCH [REQUEST]    (INCLUSIVE)/ IDENTICAL

─── ORGANIZATION SEARCH ───

NAME [____]    DATE OF START OF EMPLOYMENT [____]

DIVISION / SECTION [____]    INCLUSIVE / IDENTICAL    INCLUDED IN ☐ACTIVITY ☐DOCUMENT ☐PROCESS

POSITION [____]    INCLUSIVE / IDENTICAL

QUALIFICATION [____]    INCLUSIVE / IDENTICAL

DATA-ENTRY-TYPE DIALOG

[ACTIVITY SEARCH]&[DOCUMENT SEARCH]
& [PROCESS SEARCH]

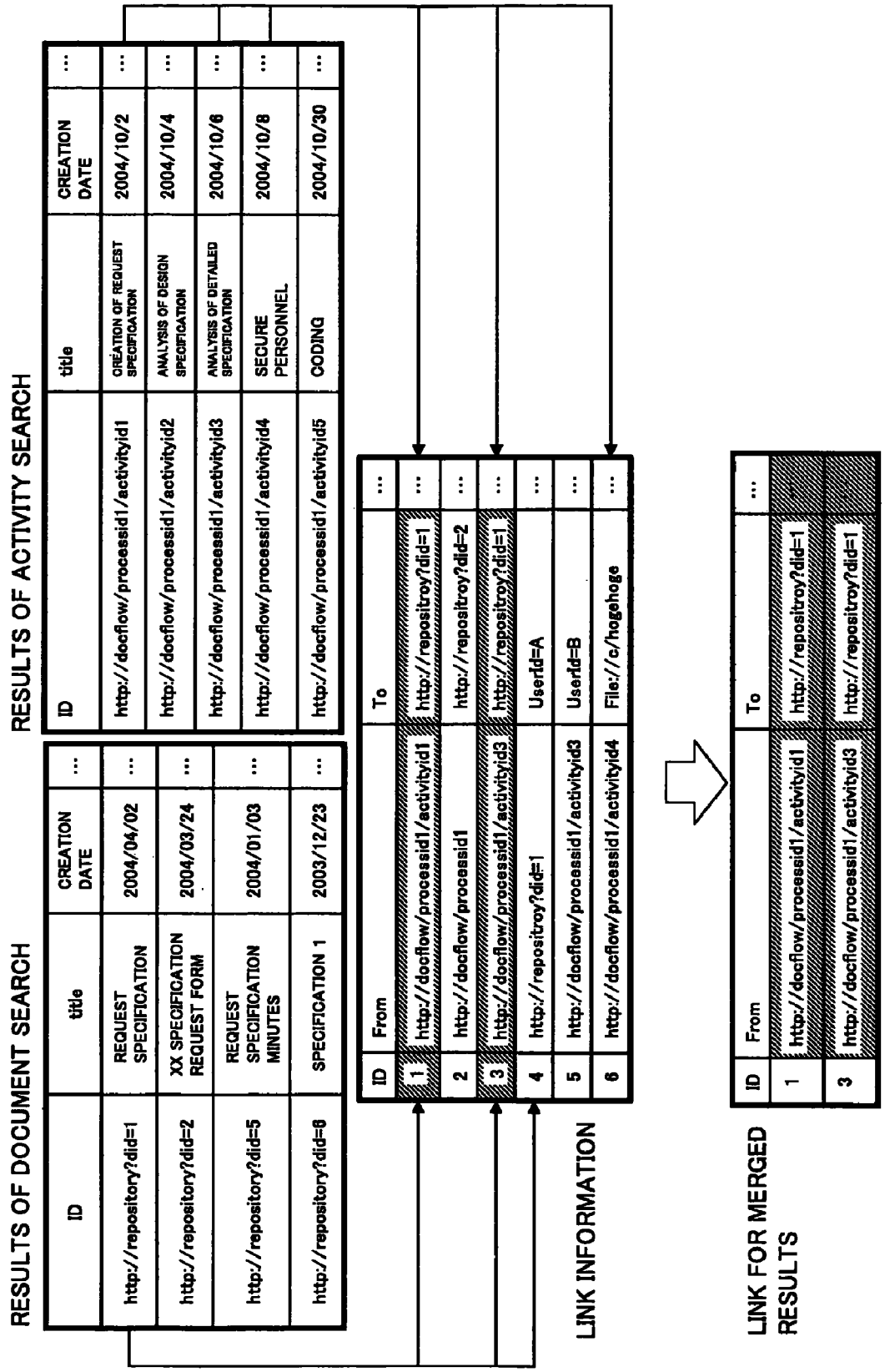

FIG.22A

| ID | title | CREATION DATE | ..... |
|---|---|---|---|
| http://docflow/processid1/activityid1 | CREATION OF REQUEST SPECIFICATION | 2004/10/02 | ..... |
| http://docflow/processid1/activityid3 | ANALYSIS OF DETAILED SPECIFICATION | 2004/10/06 | ..... |

FIG.22B

| Title | CREATION DATE | PERSON IN CHARGE | PROCESS NAME | ..... |
|---|---|---|---|---|
| CREATION OF REQUEST SPECIFICATION | 2004/10/02 | YOICHIRO MATSUNO | SYSTEM DESIGN | ..... |
| ANALYSIS OF DETAILED SPECIFICATION | 2004/10/06 | ICHIRO YAMADA | SYSTEM DESIGN | ..... |

FIG.23

☐ORGANIZATION ☐ACTIVITY ☐PROCESS ☑DOCUMENT    SEARCH ALSO IN SUB-FLOW ☐Yes ☑No    [SEARCH BUTTON]

—— PROCESS SEARCH ——

START DATE [ ]    COMPLETION DATE [ ]

NAME [ ]    INCLUSIVE / IDENTICAL    [☐ORGANIZATION ☐DOCUMENT ☐ACTIVITY INCLUDED]

PARTICIPANT [ ]    INCLUSIVE / IDENTICAL

—— ACTIVITY SEARCH ——

START DATE [ ]    COMPLETION DATE [2004/10/10]

NAME [ ]    INCLUSIVE / IDENTICAL    [☐ORGANIZATION ☐DOCUMENT ☐PROCESS INCLUDED]

PARTICIPANT [ ]    INCLUSIVE / IDENTICAL

—— DOCUMENT SEARCH ——

CREATION DATE [ ]    UPDATE DATE [ ]

DOCUMENT PROPERTY NAME [TITLE]    INCLUSIVE /(IDENTICAL)    [☐ORGANIZATION INCLUDED]

DOCUMENT PROPERTY VALUE [SPECIFICATION]    (INCLUSIVE)/ IDENTICAL    [INCLUDED IN ☑ACTIVITY ☑PROCESS]

FULL-TEXT SEARCH [ ]    INCLUSIVE / IDENTICAL

—— ORGANIZATION SEARCH ——

NAME [ ]    DATE OF START OF EMPLOYMENT [ ]

DIVISION / SECTION [ ]    INCLUSIVE / IDENTICAL    [INCLUDED IN ☐DOCUMENT ☐ACTIVITY ☐PROCESS]

POSITION [ ]    INCLUSIVE / IDENTICAL

QUALIFICATION [ ]    INCLUSIVE / IDENTICAL

DATA-ENTRY-TYPE DIALOG

[ACTIVITY SEARCH]&[DOCUMENT SEARCH] & [PROCESS SEARCH]

FIG.24A

| ID | title | CREATION DATE | ... |
|---|---|---|---|
| http://repository?did=1 | REQUEST SPECIFICATION | 2004/04/02 | ... |
| http://repository?did=3 | DETAILED SPECIFICATION | 2004/04/12 | ... |

FIG.24B

| Title | CREATION DATE | PERSON IN CHARGE | STATUS | ... |
|---|---|---|---|---|
| REQUEST SPECIFICATION | 2004/04/02 | YOICHIRO MATSUNO | COMPLETED | ... |
| DETAILED SPECIFICATION | 2004/04/12 | ICHIRO YAMADA | UNDERWAY | ... |

FIG.25

☐ ORGANIZATION ☑ ACTIVITY ☐ PROCESS ☐ DOCUMENT   SEARCH ALSO IN SUB-FLOW: ☐ Yes ☑ No   [SEARCH BUTTON]

PROCESS SEARCH

| START DATE | | COMPLETION DATE | | |
|---|---|---|---|---|
| NAME | | INCLUSIVE / IDENTICAL | | INCLUDED IN: ☐ ORGANIZATION ☐ DOCUMENT ☐ ACTIVITY ☐ INCLUDED |
| PARTICIPANT | | INCLUSIVE / IDENTICAL | | |

ACTIVITY SEARCH

| START DATE | | COMPLETION DATE | | |
|---|---|---|---|---|
| NAME | | INCLUSIVE / IDENTICAL | | INCLUDED IN: ☐ ORGANIZATION ☐ DOCUMENT ☐ PROCESS ☐ INCLUDED |
| PARTICIPANT | | INCLUSIVE / IDENTICAL | | |

DOCUMENT SEARCH

| CREATION DATE | | UPDATE DATE | | |
|---|---|---|---|---|
| DOCUMENT PROPERTY NAME | TITLE | INCLUSIVE / (IDENTICAL) | | INCLUDED IN: ☐ ORGANIZATION ☐ INCLUDED |
| DOCUMENT PROPERTY VALUE | SPECIFICATION | (INCLUSIVE) / IDENTICAL | | ☑ ACTIVITY ☐ PROCESS |
| FULL-TEXT SEARCH | | INCLUSIVE / IDENTICAL | | |

ORGANIZATION SEARCH

| NAME | | DATE OF START OF EMPLOYMENT | | |
|---|---|---|---|---|
| DIVISION / SECTION | DEVELOPMENT | INCLUSIVE / (IDENTICAL) | | INCLUDED IN: ☐ ACTIVITY ☐ PROCESS |
| POSITION | | INCLUSIVE / IDENTICAL | | |
| QUALIFICATION | | INCLUSIVE / IDENTICAL | | |

DATA-ENTRY-TYPE DIALOG

[ACTIVITY SEARCH]&[DOCUMENT SEARCH]&
[PROCESS SEARCH]&[ORGANIZATION SEARCH]

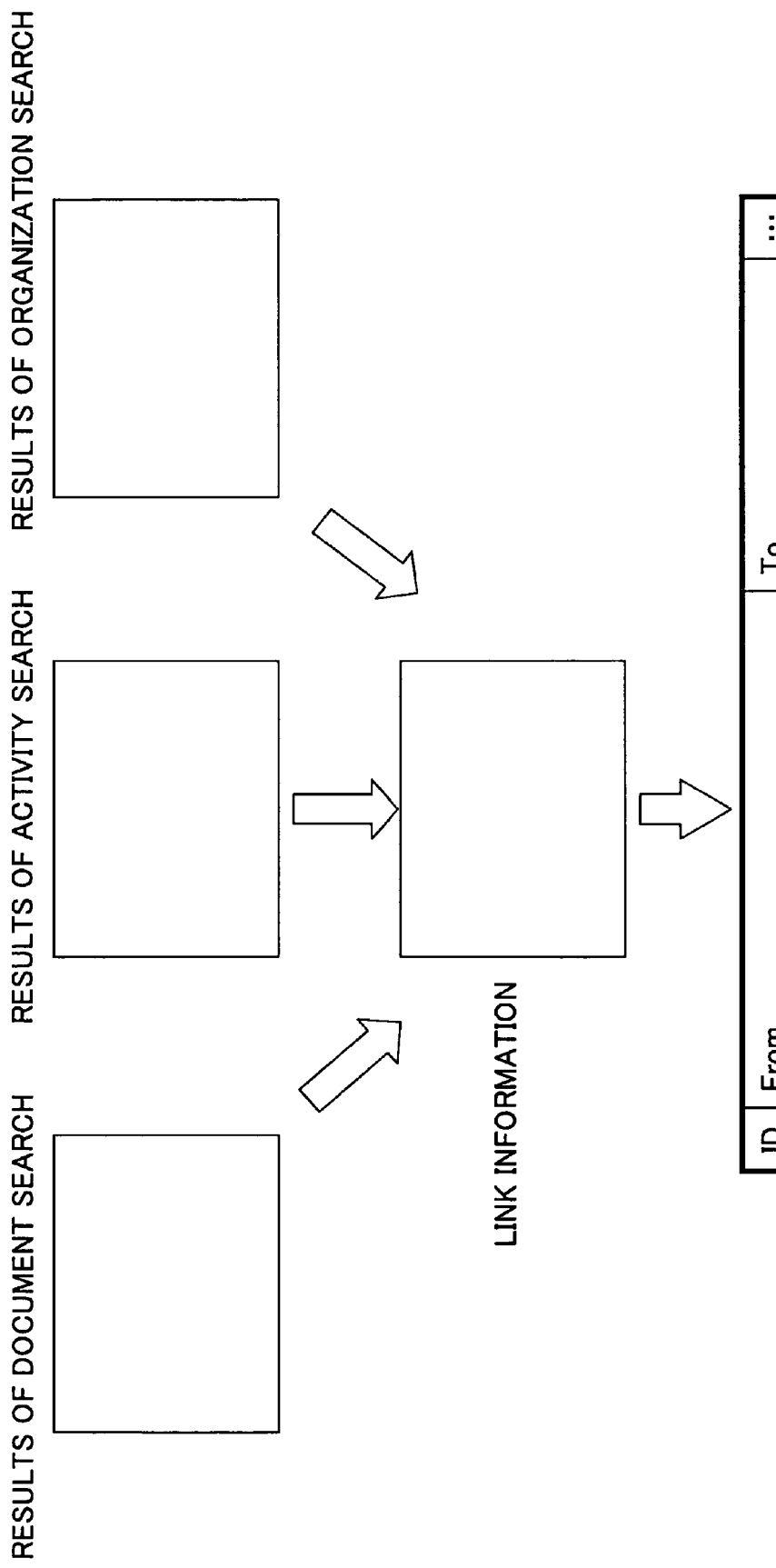

FIG.27A

| ID | title | CREATION DATE | ... |
|---|---|---|---|
| http://docflow/processid1/activityid1 | CREATION OF REQUEST SPECIFICATION | 2004/10/02 | ... |
| http://docflow/processid1/activityid3 | CREATION OF DETAILED SPECIFICATION | 2004/10/06 | ... |

FIG.27B

| Title | START DATE | PERSON IN CHARGE | STATUS | ... |
|---|---|---|---|---|
| CREATION OF REQUEST SPECIFICATION | 2004/10/02 | YOICHIRO MATSUNO | COMPLETED | ... |
| CREATION OF DETAILED SPECIFICATION | 2004/10/06 | ICHIRO YAMADA | UNDERWAY | ... |

FIG.30

| ID | From | To | |
|----|------|-----|---|
| 1 | http://docflow/processid2/activityid1 | http://repositroy?did=1 | ... |
| 2 | http://docflow/processid1 | http://repositroy?did=2 | ... |
| 3 | http://docflow/processid1/activityid3 | http://repositroy?did=1 | ... |
| 4 | http://repositroy?did=1 | UserId=A | ... |
| 5 | http://docflow/processid1/activityid3 | http://docflow/processid4 | ... |
| 6 | http://docflow/processid1/activityid4 | File://c/hogehoge | ... |

PROCESS ID

ACTIVITY ID

FIG.31

☐ORGANIZATION ☑ACTIVITY ☐PROCESS ☐DOCUMENT      SEARCH ALSO IN SUB-FLOW ☑Yes ☐No    [SEARCH BUTTON]

PROCESS SEARCH

START DATE                                                              COMPLETION DATE
NAME                    [           ]   INCLUSIVE / IDENTICAL           [           ]   INCLUDED IN ☐ACTIVITY    ☐ORGANIZATION ☐DOCUMENT ☐ACTIVITY ☐INCLUDED
PARTICIPANT             [           ]   INCLUSIVE / IDENTICAL

ACTIVITY SEARCH

START DATE                                                              COMPLETION DATE
NAME                    [           ]   INCLUSIVE / IDENTICAL           [           ]   INCLUDED IN ☐PROCESS    ☐ORGANIZATION ☐DOCUMENT ☐PROCESS ☐INCLUDED
PARTICIPANT             [           ]   INCLUSIVE / IDENTICAL

DOCUMENT SEARCH

CREATION DATE                                                           UPDATE DATE
DOCUMENT PROPERTY NAME  [TITLE]         INCLUSIVE /(IDENTICAL)          [           ]   INCLUDED IN ☑ACTIVITY   ☐ORGANIZATION ☐INCLUDED
DOCUMENT PROPERTY VALUE [SPECIFICATION] (INCLUSIVE)/ IDENTICAL                          ☑PROCESS
FULL-TEXT SEARCH        [           ]   INCLUSIVE / IDENTICAL

ORGANIZATION SEARCH

NAME                                                                    DATE OF START OF EMPLOYMENT
DIVISION / SECTION      [DEVELOPMENT]   INCLUSIVE /(IDENTICAL)          [           ]   INCLUDED IN ☐DOCUMENT ☐PROCESS
POSITION                [           ]   INCLUSIVE / IDENTICAL
QUALIFICATION           [           ]   INCLUSIVE / IDENTICAL

DATA-ENTRY-TYPE DIALOG

[ACTIVITY SEARCH]&[DOCUMENT SEARCH]&
[PROCESS SEARCH]&[ORGANIZATION SEARCH]

FIG.32

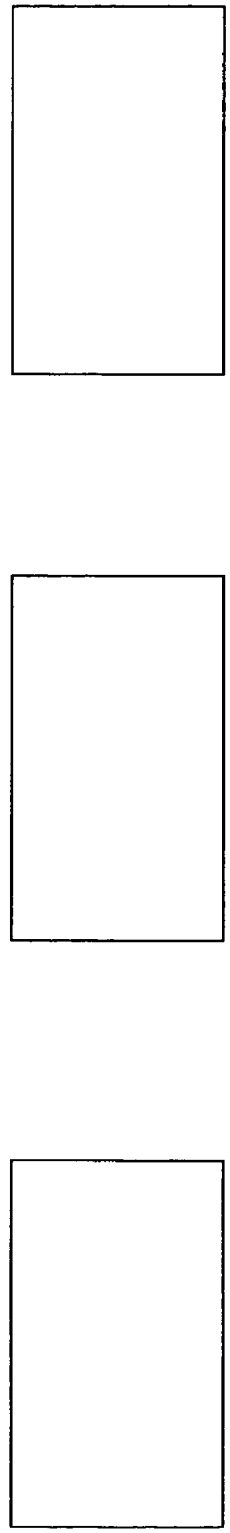

RESULTS OF DOCUMENT SEARCH    RESULTS OF ACTIVITY SEARCH    RESULTS OF ORGANIZATION SEARCH

LINK INFORMATION

| ID | From | To | ... |
|---|---|---|---|
| 1 | http://docflow/processid1/activityid1 | http://repositroy?did=1 | ... |
| 2 | http://docflow/processid1 | http://repositroy?did=2 | ... |
| 3 | http://docflow/processid1/activityid3 | http://repositroy?did=1 | ... |
| 4 | http://repositroy?did=3 | UserId=A | ... |
| 5 | http://docflow/processid1/activityid3 | http://docflow/processid3 | ... |
| 6 | http://docflow/processid3/activityid4 | http://repositroy?did=1 | ... |

LINK FOR MERGED RESULTS

| ID | From | To | ... |
|---|---|---|---|
| 1 | http://docflow/processid1/activityid1 | http://repositroy?did=1 | ... |
| 3 | http://docflow/processid1/activityid3 | http://repositroy?did=1 | ... |
| 6 | http://docflow/processid3/activityid4 | http://repositroy?did=1 | ... |

FIG.33A

| ID | title | CREATION DATE |
|---|---|---|
| http://docflow/processid1/activityid1 | CREATION OF REQUEST SPECIFICATION | 2004/04/02 |
| http://docflow/processid1/activityid3 | CREATION OF DETAILED SPECIFICATION | 2004/04/12 |
| http://docflow/processid3/activityid4 | STUDY OF DESIGN SPECIFICATION | 2004/04/12 |

FIG.33B

| Title | START DATE | PERSON IN CHARGE | STATUS | ... |
|---|---|---|---|---|
| CREATION OF REQUEST SPECIFICATION | 2004/04/02 | YOICHIRO MATSUNO | COMPLETED | ... |
| CREATION OF DETAILED SPECIFICATION | 2004/04/12 | ICHIRO YAMADA | UNDERWAY | ... |
| STUDY OF DETAILED SPECIFICATION | 2004/04/12 | ICHIRO YAMADA | UNDERWAY | ... |

FIG.36

| ID | From | To | Ref |
|---|---|---|---|
| 1 | http://hoge.com/docflow/processid2/activityid1 | http://hoge.com/rdh/repositroy?did=1 | |
| 2 | http://hoge.com/docflow/processid1 | http://hoge.com/rdh/repositroy?did=2 | |
| 3 | http://hoge.com/docflow/processid1/activityid3 | http://hoge.com/rdh/repositroy?did=1 | |
| 4 | http://hoge.com/rdh/repositroy?did=1 | UserId=A | |
| 5 | http://hoge.com/docflow/processid1/activityid3 | UserId=B | |
| 6 | http://hoge.com/docflow/processid2/activityid1 | UserId=A | 1 |
| 7 | http://hoge.com/docflow/processid2/activityid3 | UserId=A | 3 |
| 8 | http://hoge.com/docflow/processid1/activityid4 | File://c/hogehoge | |

FIG.41

☐ORGANIZATION ☑ACTIVITY ☐PROCESS ☐DOCUMENT    ☐RANKING DISPLAY    [SEARCH BUTTON]

PROCESS SEARCH

| | | COMPLETION DATE | |
|---|---|---|---|
| START DATE | | | |
| NAME | INCLUSIVE / IDENTICAL | | INCLUDED IN ☐ACTIVITY | ☐ORGANIZATION ☐DOCUMENT ☐ACTIVITY INCLUDED |
| PARTICIPANT | INCLUSIVE / IDENTICAL | | | |

ACTIVITY SEARCH

| | | COMPLETION DATE | |
|---|---|---|---|
| START DATE | | | |
| NAME | INCLUSIVE / IDENTICAL | | INCLUDED IN ☐PROCESS | ☐ORGANIZATION ☐DOCUMENT ☐PROCESS INCLUDED |
| PARTICIPANT | INCLUSIVE / IDENTICAL | | | |

DOCUMENT SEARCH

| | | UPDATE DATE | |
|---|---|---|---|
| CREATION DATE | | | |
| DOCUMENT PROPERTY NAME | INCLUSIVE / IDENTICAL | | INCLUDED IN ☑ACTIVITY ☐PROCESS | ☐ORGANIZATION INCLUDED |
| DOCUMENT PROPERTY VALUE | INCLUSIVE / IDENTICAL | | | |
| FULL-TEXT SEARCH | REQUEST | (INCLUSIVE / IDENTICAL) | | |

ORGANIZATION SEARCH

| | | DATE OF START OF EMPLOYMENT | |
|---|---|---|---|
| NAME | | | |
| DIVISION / SECTION | INCLUSIVE / IDENTICAL | | INCLUDED IN ☐DOCUMENT ☐ACTIVITY ☐PROCESS | |
| POSITION | INCLUSIVE / IDENTICAL | | | |
| QUALIFICATION | INCLUSIVE / IDENTICAL | | | |

FIG.42

LINK INFORMATION

| | From | To | | | | | |
|---|---|---|---|---|---|---|---|
| | | ... | ... | ... | ... | ... | ... |
| 1 | http://docflow/processid2/activityid1 | http://repositroy?did=1 | | | | | |
| 2 | http://docflow/processid1 | http://repositroy?did=2 | | | | | |
| 3 | http://docflow/processid1/activityid3 | http://repositroy?did=1 | | | | | |
| 4 | http://repositroy?did=1 | UserId=A | | | | | |
| 5 | http://docflow/processid1/activityid3 | http://docflow/processid4 | | | | | |
| 6 | http://docflow/processid1/activityid4 | File://c/hogehoge | | | | | |

FIG.43

| Title | START DATE | PERSON IN CHARGE | FREQUENCY OF USE |
|---|---|---|---|
| CREATION OF REQUEST SPECIFICATION | 2004/10/2 | YOICHIRO MATSUNO | 3 |
| CREATION OF DETAILED SPECIFICATION | 2004/10/6 | ICHIRO YAMADA | 2 |
| STUDY OF DETAILED SPECIFICATION | 2004/10/6 | ICHIRO YAMADA | 1 |
| ... | ... | ... | ... |

MANAGEMENT OF PROCESSES BASED ON REFERENCE INFORMATION

BACKGROUND OF THE INVENTION

1. Field of the Invention

The present invention relates to a process management apparatus, a user terminal apparatus, a process management program, a user terminal program, a record medium, a process management method, and a search method.

2. Description of the Related Art

In recent years, the workflow system has become known that manages and automates the flow of documents and information passed between concerned parties for the purpose of facilitating smooth work when these parties work together via a network (see Non-patent Document 1 through 3, for example).

FIG. 1 is a diagram showing an example of a related-art workflow system. FIG. 1 illustrates an example of the related-art.

A document management system for managing documents and a constituent information management system for managing constituent information may be already in existence. In such a case, as shown in FIG. 1, a newly created workflow system copies a document from the document management system according to need, and attaches attribute information and the like regarding the workflow to the copied document, followed by storing the document in the database of its own. The workflow system further copies constituent information from the constituent information management system, and attaches attribute information and the like regarding the workflow to the copied constituent information, followed by storing the document in the database of its own. In this manner, the documents and constituent information are used for processes relating to the workflow. Here, the constituent information refers, for example, to user information (or company member information) in the company or the like where the constituent information management system is installed, and also refers to information about groups and organizations to which the users belong.

[Non-Patent Document 1]

Haruo HAYAMI, "Workflow Management System Having Advanced This Far (1)," Information Processing Society of Japan Magazine, Vol. 39, No. 11, pp. 1160-1165 (1998)

[Non-Patent Document 2]

Haruo HAYAMI, "Workflow Management System Having Advanced This Far (2)," Information Processing Society of Japan Magazine, Vol. 39, No. 12, pp. 1258-1263 (1998)

[Non-Patent Document 3]

Haruo HAYAMI, et al., "Workflow Management System Having Advanced This Far (3)," Information Processing Society of Japan Magazine, Vol. 40, No. 5, pp. 507-513 (1998)

In the method illustrated in FIG. 1 as described above, modification may be made to documents in the document management system or to constituent information in the constituent information management system. In this case, such modifications must be reflected in the workflow system that has copied these documents or the constituent information.

In many cases, however, the administrator of the workflow system, the administrator of the document management system, and the administrator of the constituent information management system are all different. It is thus sometimes difficult to make modifications promptly reflected in other systems.

In recent years, an increasing importance has been attached to the prevention of leakage of confidential corporate documents, private information, and the like. In such a climate, copying of documents and/or constituent information may not be permitted in consideration of security.

Accordingly, there is a need for a workflow that can be used without a need to copy information from another system, and that can flexibly cope with modifications to the information. There is another need for a method of conducting a quick, efficient search for processes, activities, documents, and/or constituent information relating to each other.

SUMMARY OF THE INVENTION

It is a general object of the present invention to provide a workflow and search method that substantially obviate one or more problems caused by the limitations and disadvantages of the related art.

Features and advantages of the present invention will be presented in the description which follows, and in part will become apparent from the description and the accompanying drawings, or may be learned by practice of the invention according to the teachings provided in the description. Objects as well as other features and advantages of the present invention will be realized and attained by a workflow and search method particularly pointed out in the specification.

To achieve these and other advantages, the invention provides an apparatus for managing one or more processes, which includes a reference relation information managing unit configured to manage information about reference relations between the one or more processes, one or more activities constituting the one or more processes, and one or more documents relating to at least one of the one or more processes and the one or more activities, or about reference relations between the one or more processes, the one or more activities, and one or more participants relating to at least one of the one or more processes and the one or more activities.

According to at least one embodiment of the present invention, the provision of the reference relation information managing unit in the process management apparatus provides a workflow that allows information in another system to be used without copying thereof, and that can flexibly cope with modification made to such information.

The apparatus for managing one or more processes corresponds to the workflow server 1. The participants correspond to the constituent information. The reference relation information managing unit corresponds to the link engine 52. Further, the participants include those who participate, those who engage, those who access information, those who manage information, etc.

According to another aspect of the present invention, a user terminal apparatus adapted to be coupled to the apparatus as described above through a network includes a search screen displaying unit configured to display a search screen operable to receive information about at least one of the one or more processes, the one or more activities, the one or more documents, and the one or more participants as a search condition.

According to at least one embodiment of the present invention, the provision of the search screen displaying unit in the user terminal apparatus connected to the process management apparatus through a network makes it possible to conduct an efficient, high-speed search for processes, activities, documents, constituent information related to each other.

The user terminal apparatus corresponds to the client 3. The search screen displaying unit corresponds to the GUI generating unit 21, for example.

The present invention further provides a record medium having a process management program embodied therein, a record medium having a user terminal program embodied therein, such programs, a method of managing one or more processes, and a method of conducting a search.

At least one embodiment of the present invention provides a workflow that allows information in another system to be used without copying thereof, and that can flexibly cope with modification made to such information. Further, at least one embodiment of the present invention provides for an efficient, high-speed search to be conducted to find processes, activities, documents, constituent information, etc., related to each other.

BRIEF DESCRIPTION OF THE DRAWINGS

Other objects and further features of the present invention will be apparent from the following detailed description when read in conjunction with the accompanying drawings, in which:

FIG. 16 is a drawing for explaining an example of a process relating to document registration in the link engine;

FIG. 18 is a drawing showing an example of a GUI relating to search operation for use at the client;

FIG. 21 is a drawing for explaining the merging of search results;

FIGS. 22A and 22B are drawings showing merged results;

FIG. 23 is a drawing showing a GUI relating to search operation for use at the client;

FIGS. 24A and 24B are drawings showing merged results;

FIG. 25 is a drawing showing a GUI relating to search operation for use at the client;

FIG. 26 is a drawing for explaining the merging of search results;

FIGS. 27A and 27B are drawings showing merged results;

FIG. 30 is a drawing for explaining an example of a process relating to sub-flow registration performed by the link engine;

FIG. 31 is a drawing showing a GUI relating to search operation for use at the client;

FIG. 32 is a drawing for explaining the merging of search results;

FIGS. 33A and 33B are drawings showing merged results;

FIG. 36 is a drawing showing an example of link information obtained by the addition of a link;

FIG. 41 is a drawing showing a GUI relating to search operation for use at the client;

FIG. 42 is a drawing showing an example of link information; and

FIG. 43 is a drawing showing a GUI relating to search results for use at the client.

DESCRIPTION OF THE PREFERRED EMBODIMENTS

Figure 1:
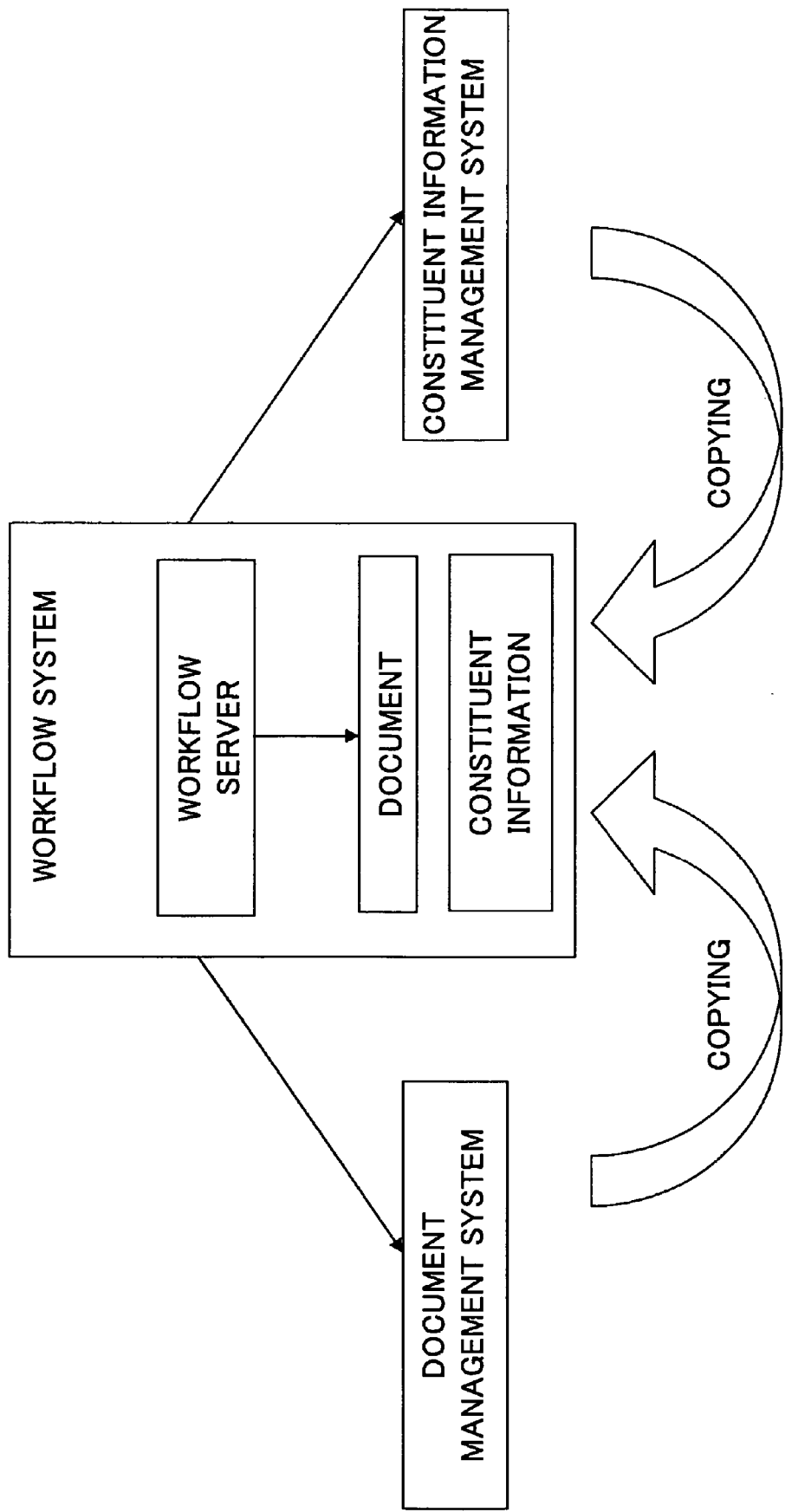
FIG. 1 is a diagram showing an example of a related-art workflow system.
Figure 2:
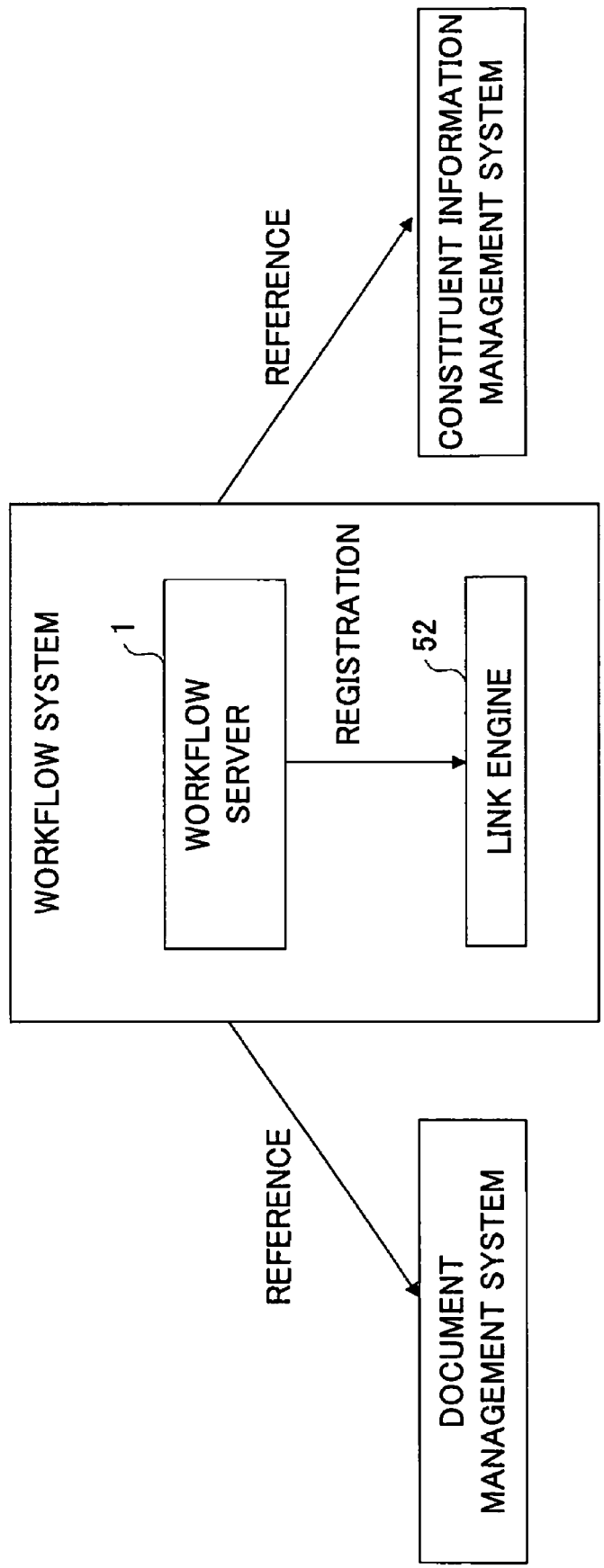
FIG. 2 is a drawing showing an outline of a workflow system according to the present invention in comparison with the related-art technology.

In the following, embodiments of the present invention will be described with reference to the accompanying drawings. The outline of the present invention will be described with reference to FIG. 2 in comparison with the related-art technology shown in FIG. 1. FIG. 2 is a drawing showing the outline of the present invention in comparison with the related-art technology.

As shown in FIG. 2, a workflow server 1 (hereinafter simply referred to as a server) according to the present invention registers information (e.g., document identification information) about documents stored in a document management system or the like and information (constituent information identification information) about constituent information stored in a constituent information management system or the like, such that registration is made in a link engine 52 (which will be described later) by linking such information items to each other and/or to the processes and activities of a workflow. With this provision, the documents stored in the document management system or the like and/or the constituent information stored in the constituent information management system or the like can be used in the workflow system without making copies of these information items.

In the following, a description will be given by assuming that documents and constituent information are stored in the server 1 for the sake of simplification of explanation. This is not intended to limit the scope of the present invention.

Figure 3:
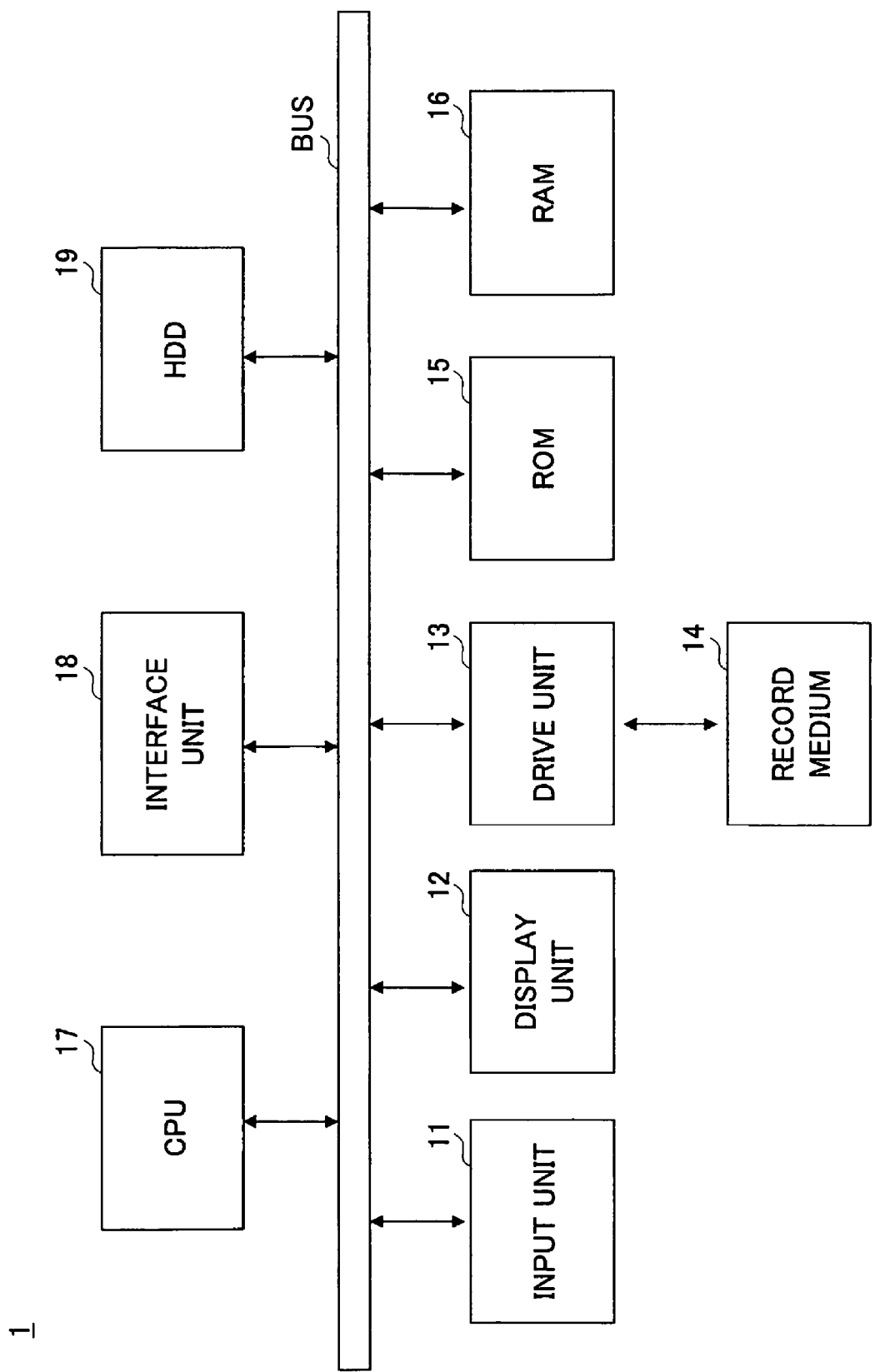
FIG. 3 is a drawing showing an example of the hardware construction of a server.

In what follows, an example of the hardware construction of the server 1 will be described with reference to FIG. 3. FIG. 3 is a drawing showing an example of the hardware construction of the server.

The hardware construction of the server 1 shown in FIG. 3 includes an input unit 11, a display unit 12, a drive unit 13, a ROM (Read Only Memory) 15, a RAM (Random Access Memory) 16, a CPU (Central Processing Unit) 17, an interface unit 18, and an HDD (Hard Disk Drive) 19, which are connected to each other through a bus.

The input unit 11 is comprised of a keyboard and mouse or the like for operation by the user of the server 1, and is used to enter various operation signals into the server 1. The display unit 12 is comprised of a display apparatus or the like for use by the user of the server 1, and serves to display various information. The interface unit 18 serves to connect the server 1 to a network or the like.

A Web service 40, a document management unit 51, the link engine 52, a workflow engine 53, a constituent information management unit 54 and so on that are programs corresponding to yet-to-be-described modules are provided to the server 1 in the form of a record medium 14 such as a CD-ROM, or may be downloaded through the network. The record medium 14 is inserted into the drive unit 13, and the programs are installed from the record medium 14 to the HDD 19 through the drive unit 13.

The ROM 15 stores therein data and the like. The RAM 16 stores therein programs and the like that are read from the HDD 19 at the time of power-on of the server 1. The CPU 17 performs processes according to the programs and the like retrieved and stored in the RAM 16.

Figure 4:
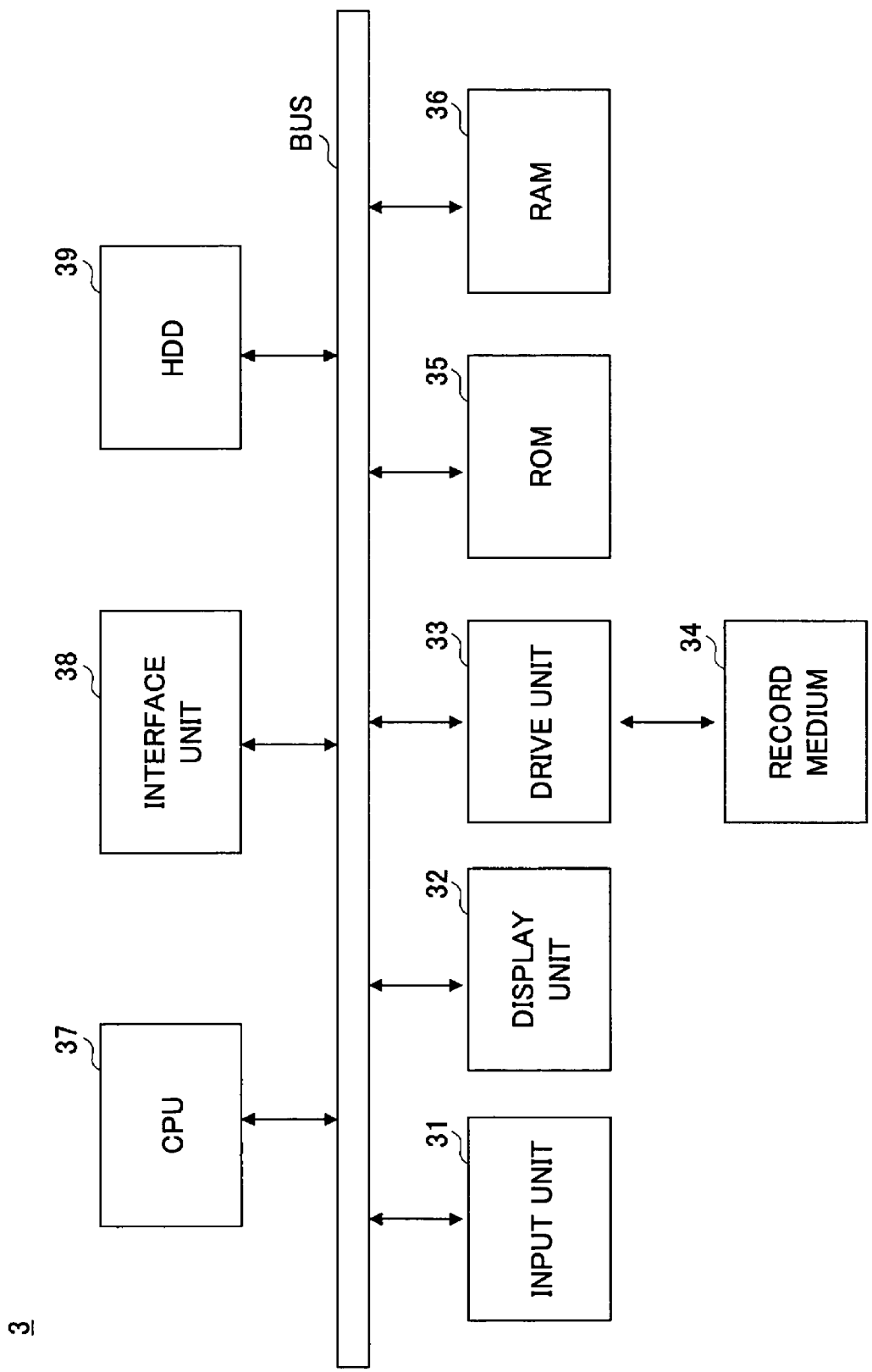
FIG. 4 is a drawing showing an example of the hardware construction of a client.

In the following, an example of the hardware construction of a client 3 will be described with reference to FIG. 4. FIG. 4 is a drawing showing an example of the hardware construction of a client.

The hardware construction of the client 3 shown in FIG. 4 includes an input unit 31, a display unit 32, a drive unit 33, a ROM 35, a RAM 36, a CPU 37, an interface unit 38, and an HDD 39, which are connected to each other through a bus.

The input unit 31 is comprised of a keyboard and mouse or the like for operation by the user of the client 3, and is used to enter various operation signals into the client 3. The display unit 32 is comprised of a display apparatus or the like for use by the user of the client 3, and serves to display various information. The interface unit 38 serves to connect the client 3 to a network or the like.

A GUI generating unit 21, a control unit 22, an XML analyzing unit 23, an XML generating unit 24, an I/F unit 25, and so on that are programs corresponding to yet-to-be-described modules are provided to the client 3 in the form of a record medium 34 such as a CD-ROM, or may be downloaded through the network. The record medium 34 is inserted into the drive unit 33, and the programs are installed from the record medium 34 to the HDD 39 through the drive unit 33.

The ROM 35 stores therein data and the like. The RAM 36 stores therein programs and the like that are read from the HDD 39 at the time of power-on of the client 3. The CPU 37 performs processes according to the programs and the like retrieved and stored in the RAM 36.

Figure 5:
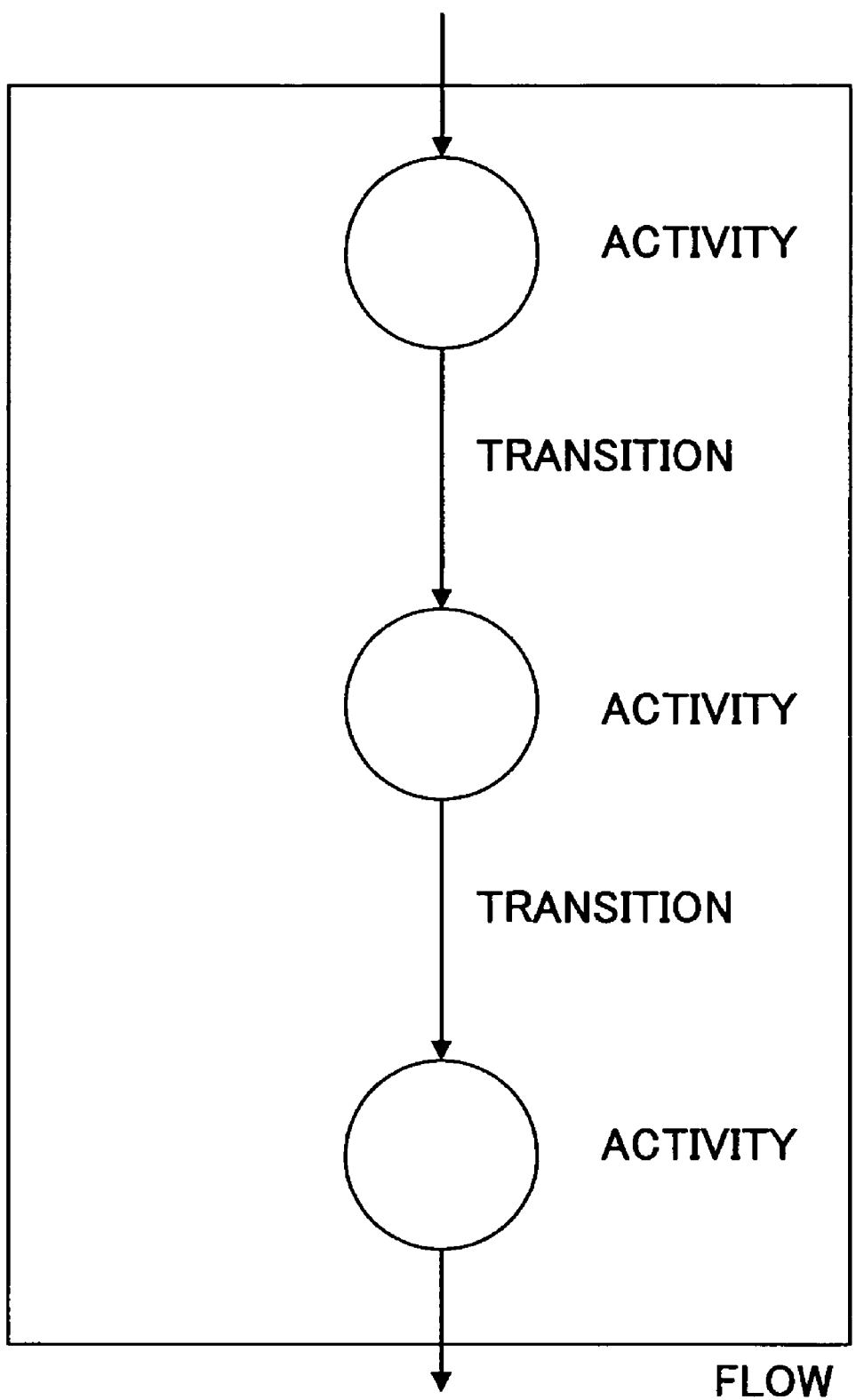
FIG. 5 is a drawing for explaining terms used in the present specification.

In the following, terms used in the present specification will be described with reference to FIG. 5. FIG. 5 is a drawing for explaining the terms used in the present specification.

In this specification, a process refers a flow of a process for achieving a given project. Activities refer to individual tasks constituting the process. Each activity has a started state, a completed state, a standby state, and the like. By using transitions between these states, a workflow system comprised of the server 1 and at least one client 3 expresses the progress of the process. Transition defines an order in which activities are performed. Transition also has its states, by use of which the workflow system determines the conditions upon which state transitions are made with respect to connected activities.

A flow refers to a flowchart of a process represented by use of activities and transitions. A process definition refers to a template of a process, and defines the flow of a process prior to its execution. A process instance flow is a flow of an ongoing process.

A process instance is what is made by turning a process definition into substance, and contains the contents of an actual project. The process instance flow as described above defines the flow of a process instance, and is generally the same as the process definition that has served as a basis.

In the workflow system of the present invention, the process instance flow and the process definition are treated as different substances, thereby allowing separate manipulations thereof. In the workflow system of the present invention, therefore, a change in the process instance flow, when it is made, will not be reflected by the process definition that has served as a basis. Also, a change in the process definition will not be reflected by the process that has already turned into an instance.

Figure 6:
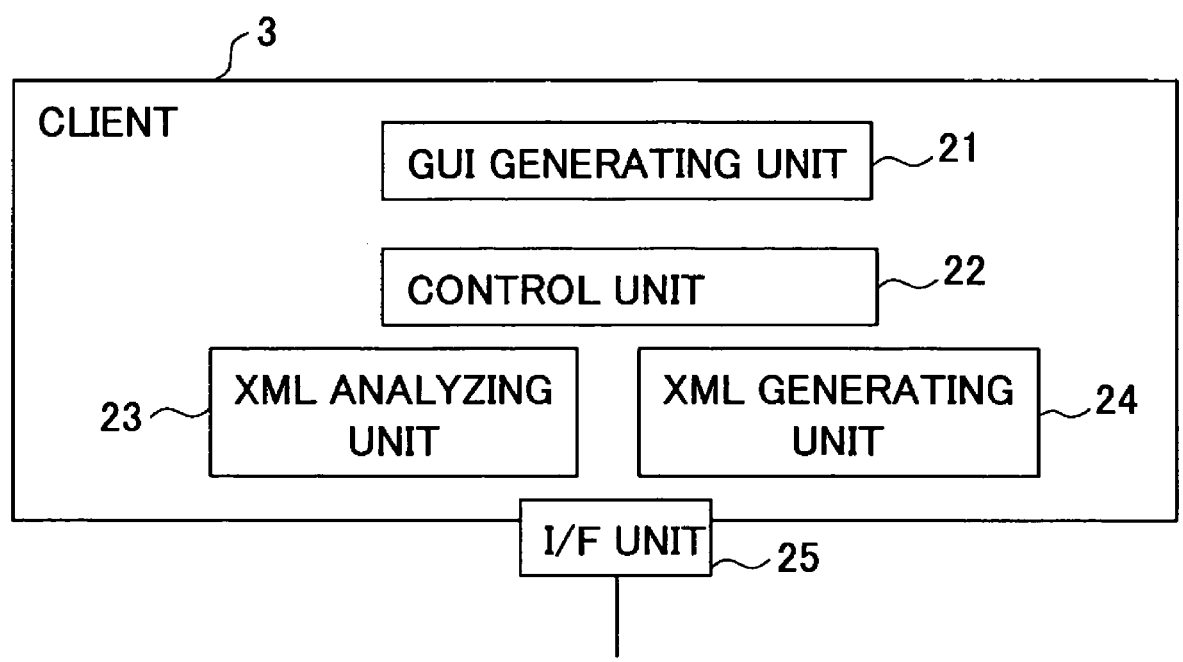
FIG. 6 is a drawing showing an example of the module configuration of the client.

In the following, an example of modules provided in the client 3 will be described with reference to FIG. 6. FIG. 6 is a drawing showing an example of the module configuration of the client.

As shown in FIG. 6, the client 3 includes the GUI generating unit 21, the control unit 22, the XML analyzing unit 23, the XML generating unit 24, and the I/F unit 25.

The GUI generating unit 21 generates GUIs as will be described later for presentation to the user. The control unit 22 serves to perform overall control of the client 3. The XML analyzing unit 23 serves to analyze XML (extensible Markup Language) portions when communication is conducted with the server 1 or the like based on SOAP (Simple Object Access Protocol). The XML generating unit 24 serves to generate XML portions when communication is conducted with the server 1 or the like based on SOAP. The I/F unit 25 provides interface between the client 3 and the server 1 or the like.

Figure 7:
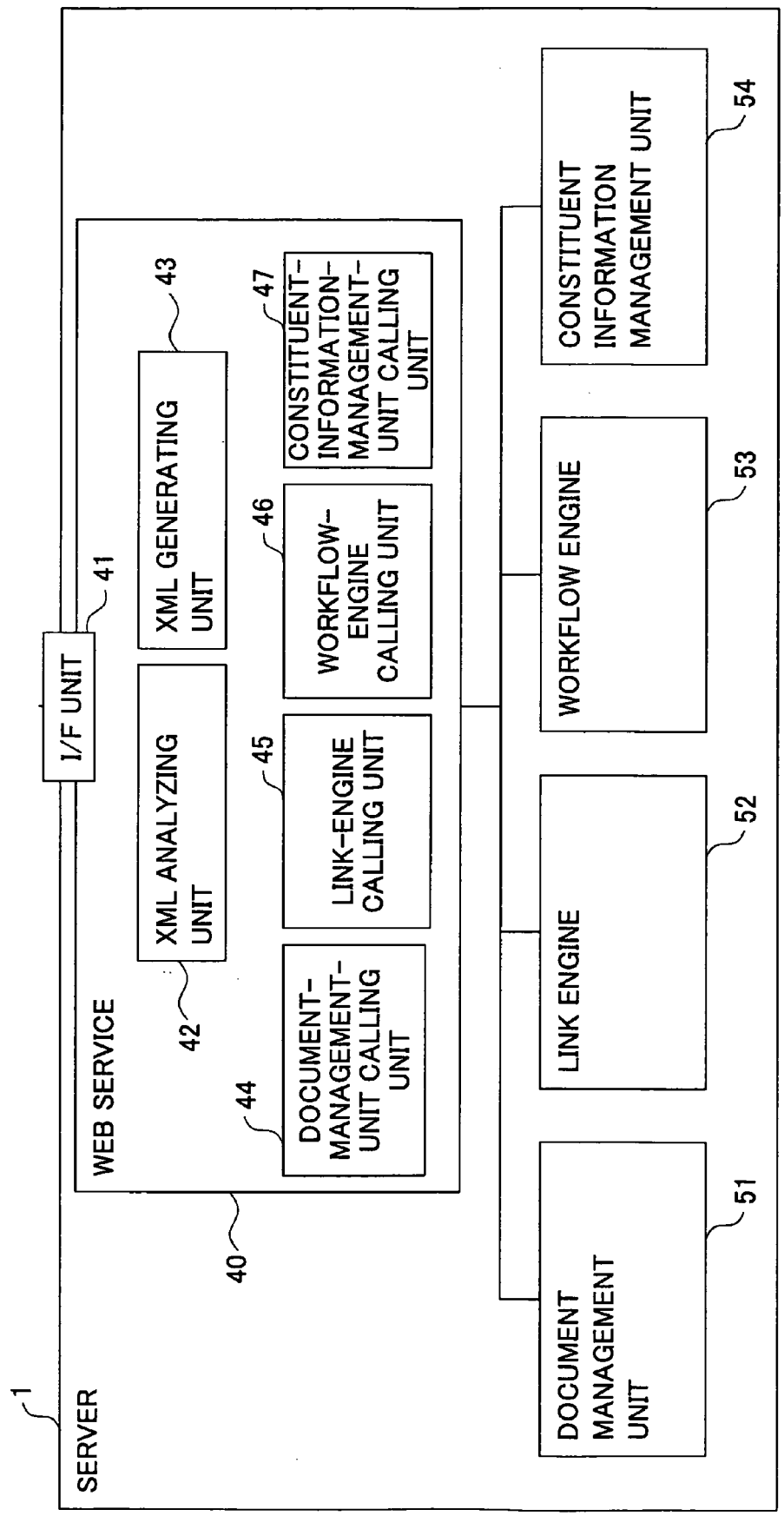
FIG. 7 is a drawing showing an example of the module configuration of the server.

In the following, an example of modules provided in the server 1 will be described with reference to FIG. 7. FIG. 7 is a drawing showing an example of the module configuration of the server.

As shown in FIG. 7, the server 1 includes the Web service 40, the document management unit 51, the link engine 52, the workflow engine 53, and the constituent information management unit 54. The Web service 40 includes an I/F unit 41, an XML analyzing unit 42, an XML generating unit 43, a document-management-unit calling unit 44, a link-engine calling unit 45, a workflow-engine calling unit 46, and a constituent-information-management-unit calling unit 47.

The I/F unit 41 serves to provide interface between the server 1 and the client 3. The XML analyzing unit 42 serves to analyze XML portions when communication is conducted with the client 3 based on SOAP. The XML generating unit 43 serves to generate XML portions when communication is conducted with the client 3 based on SOAP. The document-management-unit calling unit 44 serves to call up the document management unit 51 in response to a request or the like from the client 3. The link-engine calling unit 45 serves to call up the link engine 52 in response to a request or the like from the client 3. The workflow-engine calling unit 46 serves to call up the workflow engine 53 in response to a request or the like from the client 3. The constituent-information-management-unit calling unit 47 serves to call up the constituent information management unit 54 in response to a request or the like from the client 3.

The document management unit 51 serves to manage documents. An example of the module configuration of the document management unit 51 will later be described with reference to FIG. 8. The link engine 52 is an engine for performing processes relating to links. An example of the module configuration of the link engine 52 will later be described with reference to FIG. 9. The workflow engine 53 is an engine for performing processes relating to a workflow. An example of the module configuration of the workflow engine 53 will later be described with reference to FIG. 10. The constituent information management unit 54 serves to manage constituent information such as user information, group information, organizational information. An example of the module configuration of the constituent information management unit 54 will later be described with reference to FIG. 11.

Figure 8:
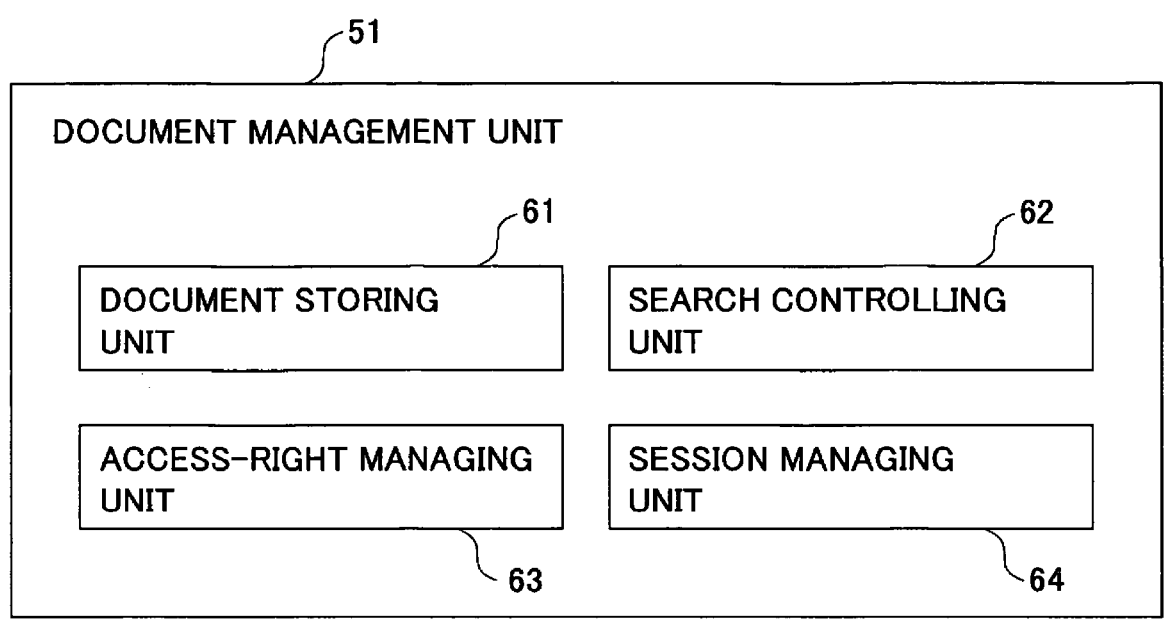
FIG. 8 is a drawing showing an example of the module configuration of a document management unit.

In the following, an example of the module configuration of the document management unit 51 will be described with reference to FIG. 8. FIG. 8 is a drawing showing an example of the module configuration of the document management unit.

As shown in FIG. 8, the document management unit 51 includes a document storing unit 61, a search controlling unit 62, an access-right managing unit 63, and a session managing unit 64.

The document storing unit 61 serves as a storage for storing documents. The search controlling unit 62 serves to control a document search. The access-right managing unit 63 serves to manage the access right to access documents. The session managing unit 64 serves to manage a session with the document management unit 51.

Figure 9:
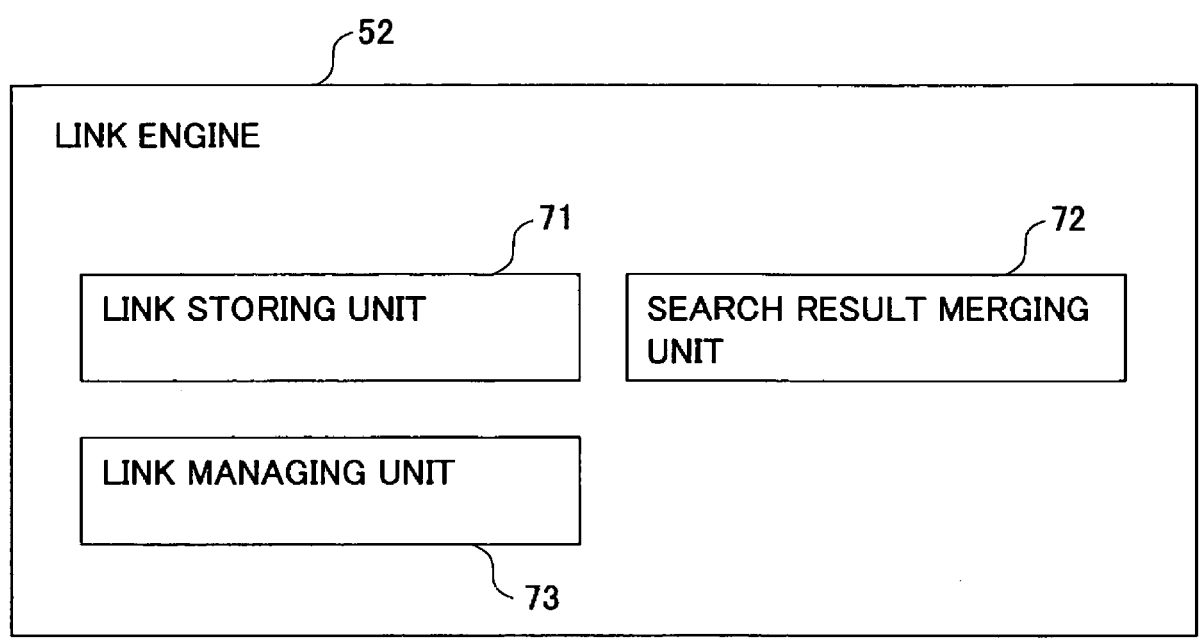
FIG. 9 is a drawing showing an example of the module configuration of a link engine.

In the following, an example of the module configuration of the link engine 52 will be described with reference to FIG. 9. FIG. 9 is a drawing showing an example of the module configuration of the link engine.

As shown in FIG. 9, the link engine 52 includes a link storing unit 71, a search result merging unit 72, and a link managing unit 73.

The link storing unit 71 serves as a storage for storing information (link information) about links with respect to processes, activities, documents, constituent information, and the like. The search result merging unit 72 is an execution unit for executing processes for merging search results obtained from the document management unit 51, the workflow engine 53, the constituent information management unit 54, and the like. The link managing unit 73 serves to manage link information. The link managing unit 73 generates (adds) links, and modifies (removes) links, for example.

Figure 10:
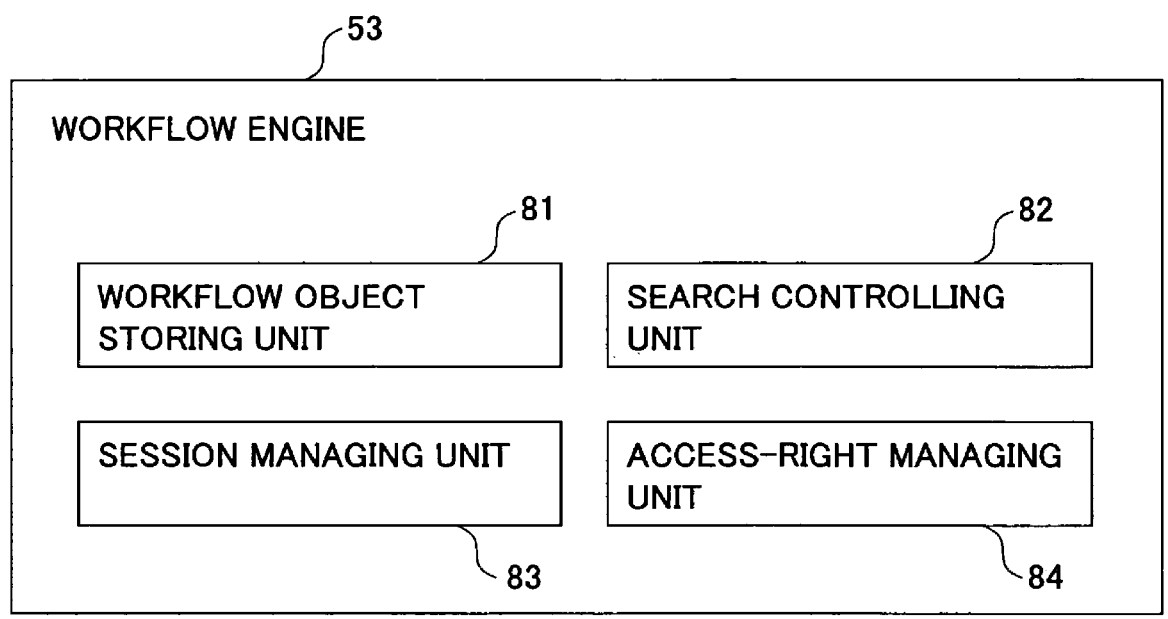
FIG. 10 is a drawing showing an example of the module configuration of a workflow engine.

In the following, an example of the module configuration of the workflow engine 53 will be described with reference to FIG. 10. FIG. 10 is a drawing showing an example of the module configuration of the workflow engine.

As shown in FIG. 10, the workflow engine 53 includes a workflow object storing unit 81, a search controlling unit 82, a session managing unit 83, and an access-right managing unit 84.

The workflow object storing unit 81 serves as a storage for storing objects relating to workflows. Objects relating to workflows include instances of processes, instances of ongoing activities, etc. The search controlling unit 82 serves to control searches for processes and activities. The session managing unit 83 serves to manage a session with the workflow engine 53. The access-right managing unit 84 serves to manage the access rights to access the objects relating to workflows.

Figure 11:
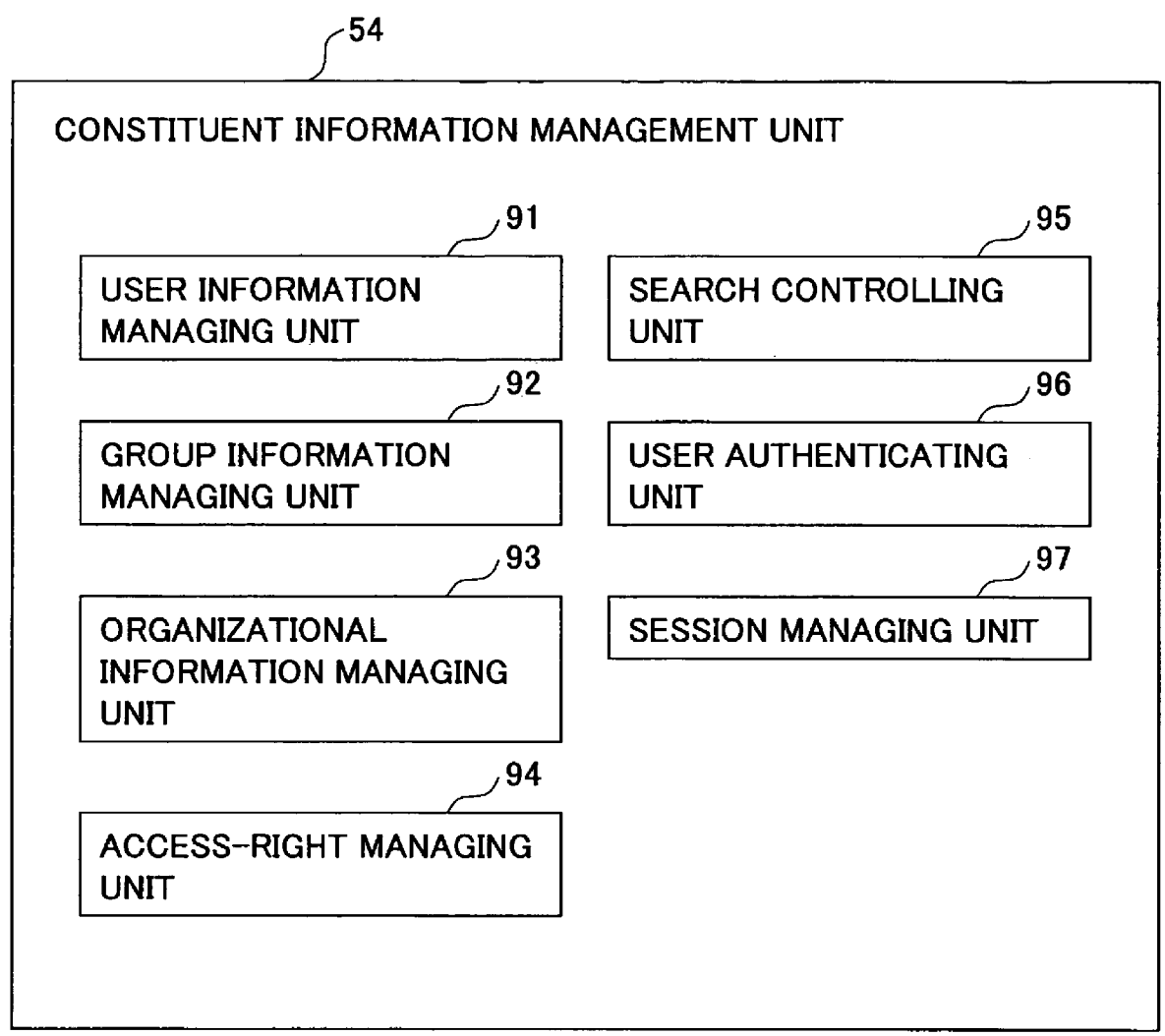
FIG. 11 is a drawing showing an example of the module configuration of a constituent information management unit.

In the following, an example of the module configuration of the constituent information management unit 54 will be described with reference to FIG. 11. FIG. 11 is a drawing showing an example of the module configuration of the constituent information management unit.

As shown in FIG. 11, the constituent information management unit 54 includes a user information managing unit 91, a group information managing unit 92, an organizational information managing unit 93, an access-right managing unit 94, a search controlling unit 95, a user authenticating unit 96, and a session managing unit 97.

The user information managing unit 91 serves to manage user information. The group information managing unit 92 serves to manage information about groups to which users belong. The organizational information managing unit 93 serves to manage information about organizations to which users belong. The access-right managing unit 94 serves to manage access rights regarding users, groups, and organizations. The search controlling unit 95 serves to control searches for users, groups, organizations, and the like. The user authenticating unit 96 serves to authenticate users. The session managing unit 97 serves to manage a session with the constituent information management unit 54. In the following, constituent information such as user information, group information, and organizational information will simply be referred to as organizational information for the sake of simplicity of explanation.

Figure 12:
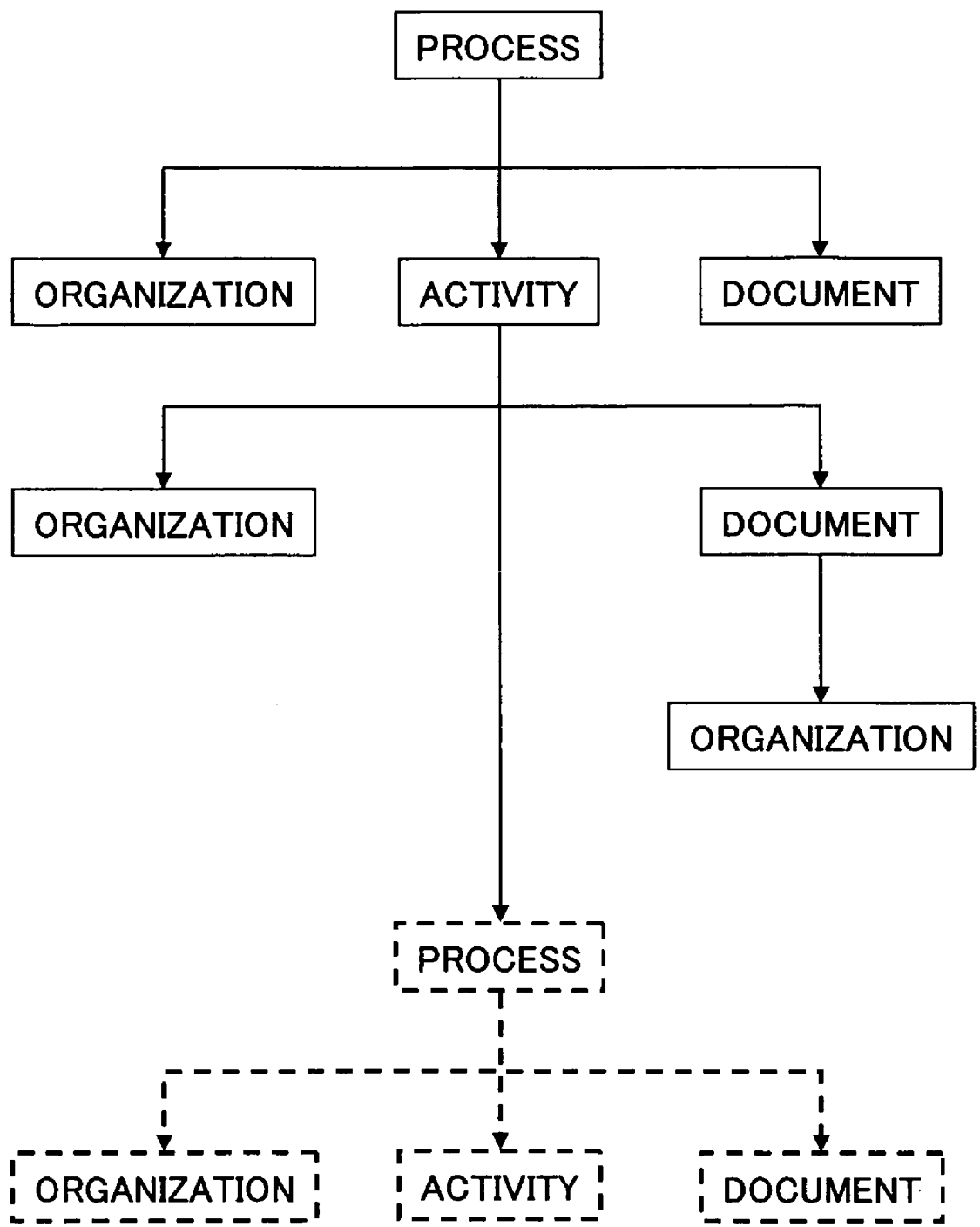
FIG. 12 is a drawing illustrating relationships between objects in a workflow system.

In what follows, an example of relationships between objects in the workflow system will be described with reference to FIG. 12. FIG. 12 is a drawing illustrating relationships between objects in the workflow system.

As shown in FIG. 12, a process is associated with organizational information regarding the process, activities constituting the process, documents relating to the process, etc.

The activities constituting a process are associated with organizational information regarding the activities and documents relating to the activities. Further, documents are also associated with organizational information about people who prepared the documents, people who can access the documents, etc. As shown in FIG. 12, further, there are cases in which an activity corresponds to a sub-process within a given process.

Figure 13:
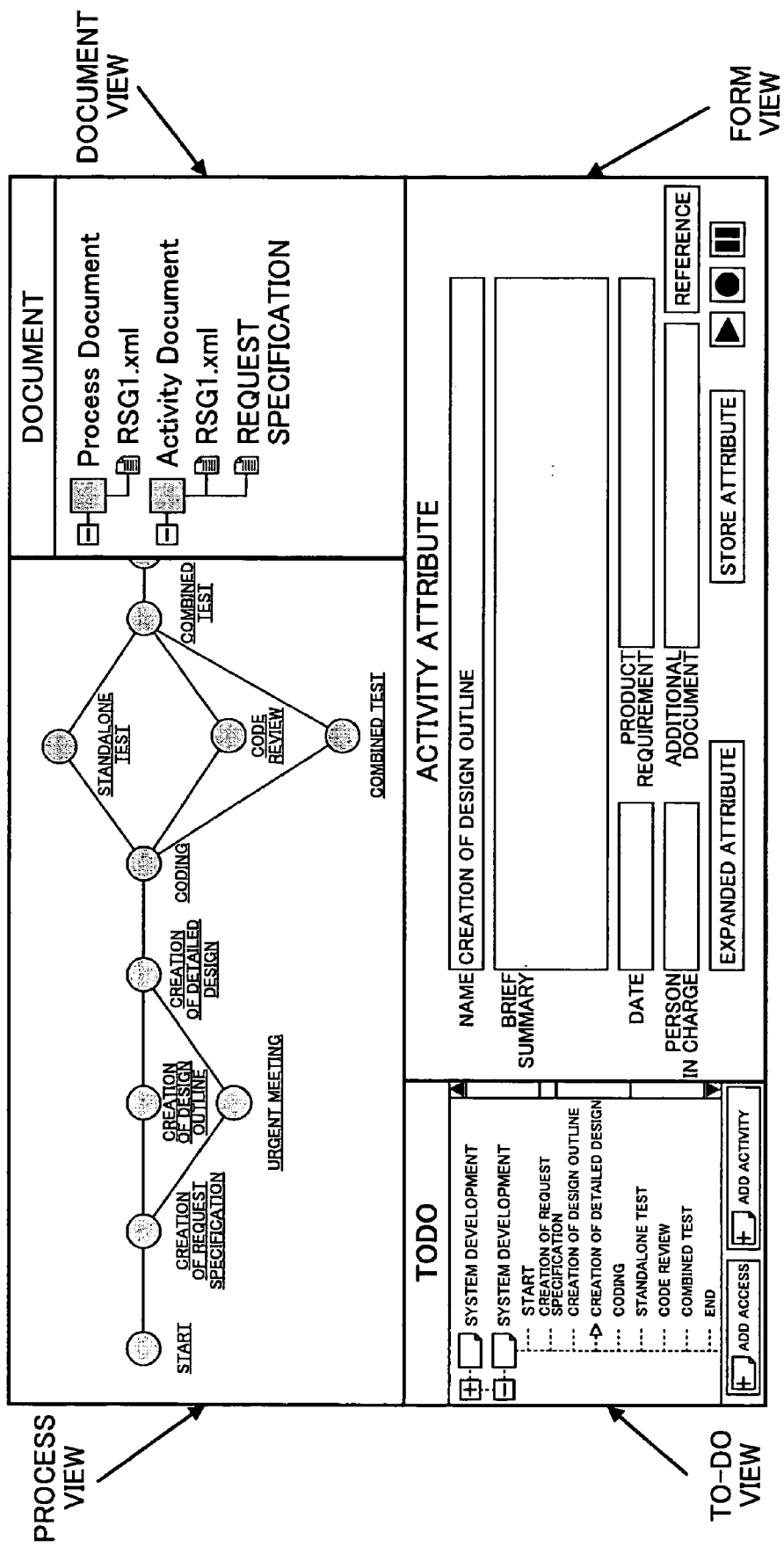
FIG. 13 is a drawing showing an example of a screen of the client.

In what follows, an example of a screen of the client 3 will be described with reference to FIG. 13. FIG. 13 is a drawing showing an example of a screen of the client.

As shown in FIG. 13, a screen includes a process view for displaying a process comprised of activities and transactions, a to-do view for displaying activities to be performed in relation to the process view, a document view for displaying documents relating to the activities and the process, and a form view for displaying and/or prompting entry of attributes of the process and activities.

Figure 14:
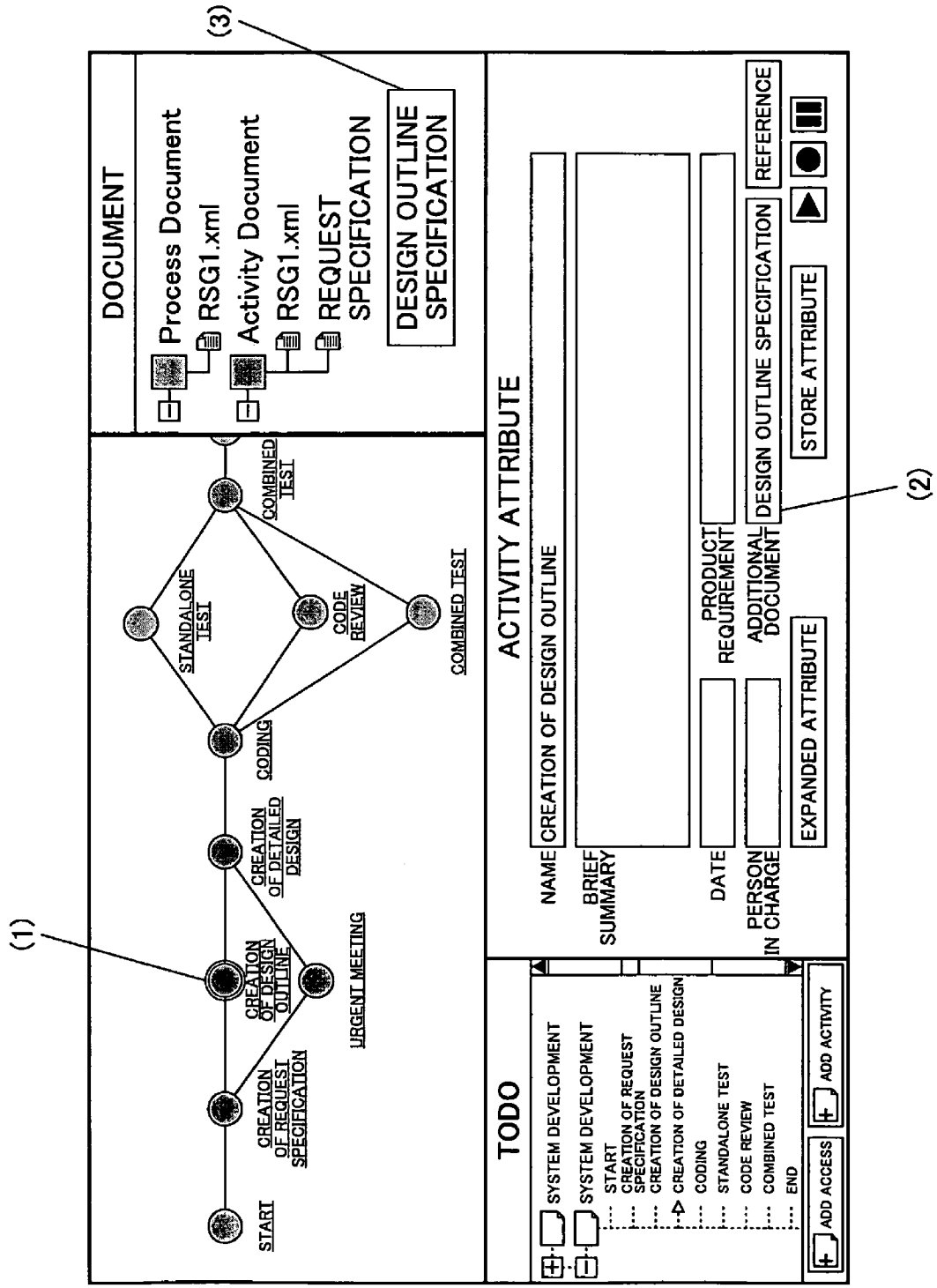
FIG. 14 is a drawing showing an example of a GUI relating to document registration for use at the client.

In the following, an example of a GUI relating to document registration in the client 3 will be described with reference to FIG. 14. FIG. 14 is a drawing showing an example of a GUI relating to document registration for use at the client.

On the process view, the user selects an activity (or process) to which the user wishes to add a document ((1) in FIG. 14). The user then selects the document to be added on the form view, thereby adding the document ((2) in FIG. 14). As the user adds the document, the client 3 displays the added document on the document view ((3) in FIG. 14).

Figure 15:
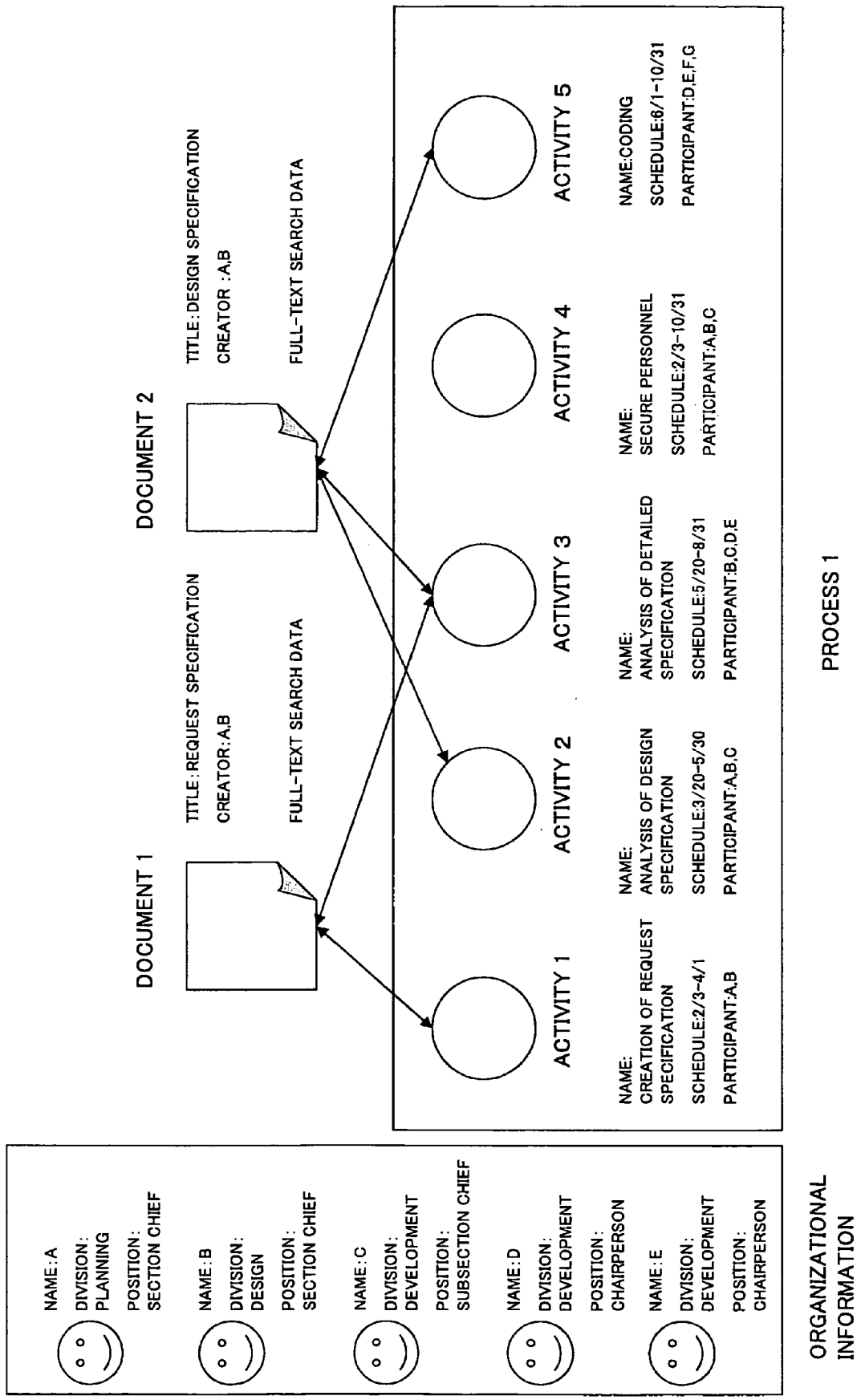
FIG. 15 is a drawing showing relationships between objects in the workflow system.

In the following, an example of relationships between objects in the workflow system will be described with reference to FIG. 15. FIG. 15 is a drawing showing relationships between objects in the workflow system.

As shown in FIG. 15, an illustrated process includes five activities, and also includes documents DOCUMENT1 and DOCUMENT2. The document DOCUMENT1 is associated with (linked to) activities ACTIVITY1 and ACTIVITY2, and the document DOCUMENT2 is associated with (linked to) activities ACTIVITY2, ACTIVITY3, and ACTIVITY5. The organization that attends to the process includes 5 users.

In the following, an example of a process relating to document registration in the link engine 52 will be described with reference to FIG. 16. FIG. 16 is a drawing for explaining an example of a process relating to document registration in the link engine.

A record corresponding to ID2 in FIG. 16 is an example of a record that is added to the link storing unit 71 or the like for the purpose of associating a process and a document with each other when the document is added to the process. A record corresponding to ID3 in FIG. 16 is an example of a record that is added to the link storing unit 71 or the like for the purpose of associating an activity and a document with each other when the document is added to the activity. A record corresponding to ID5 in FIG. 16 is an example of a record that is added for the purpose of associating a document and a user with each other when the user adds (or modifies) the document.

Figure 17:
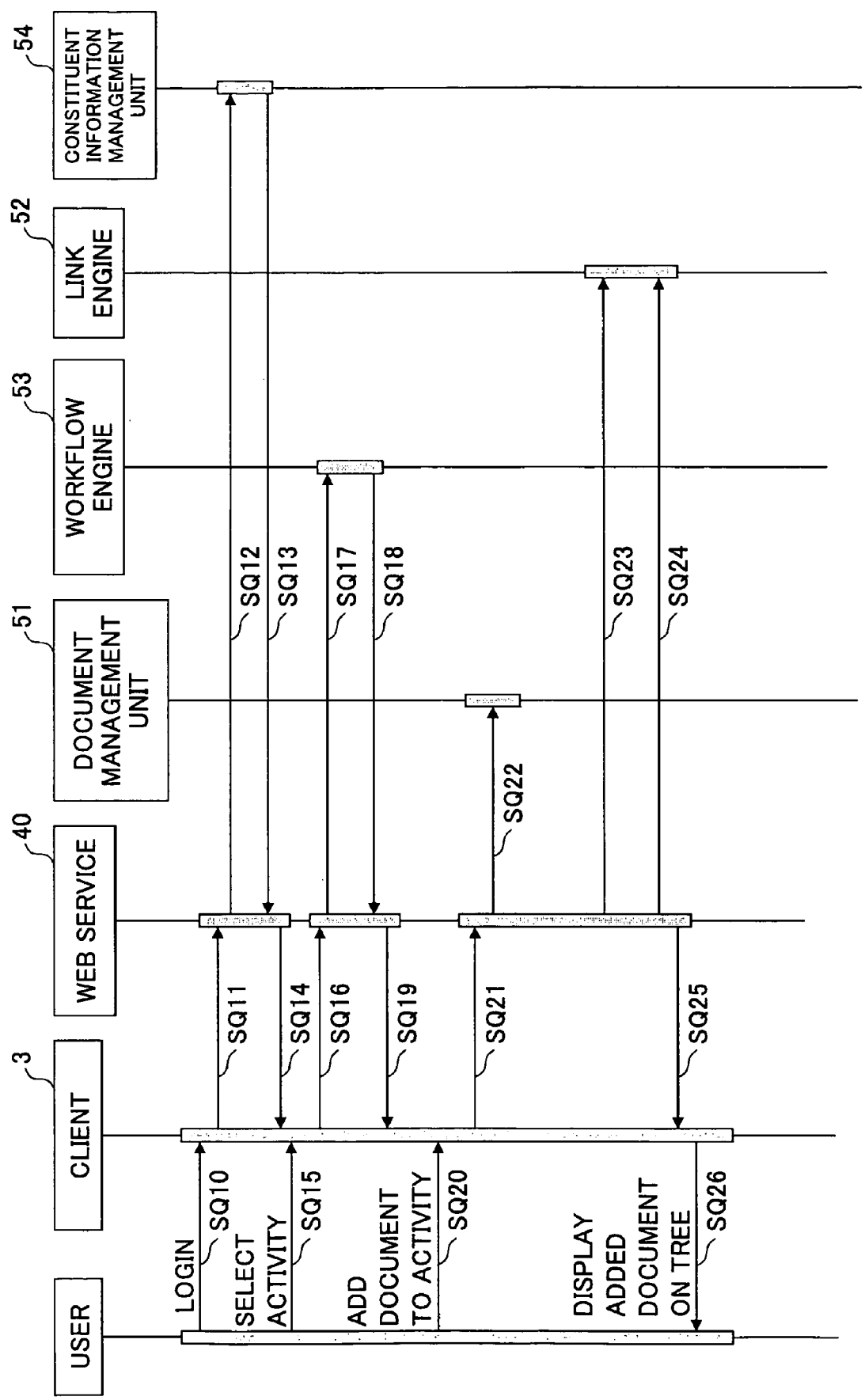
FIG. 17 is a sequence chart showing an example of document registration in the workflow system.

In the following, an example of document registration in the workflow system will be described with reference to FIG. 17. FIG. 17 is a sequence chart showing an example of document registration in the workflow system.

The user enters the user name to login to the client 3 (SQ10).

The client 3 generates a request for acquiring a user ID inclusive of the user name or the like, and transmits the request to the Web service 40 (SQ11).

Based on the request from the client 3, the Web service 40 calls up the constituent information management unit 54 (SQ12), thereby obtaining a user ID (SQ13).

The Web service 40 generates a response indicative of the acquisition of the user ID inclusive of the obtained user ID, and transmits the response to the client 3 (SQ14).

Further, the user selects an activity to which a document is added (SQ15), as was shown as (1) in FIG. 14, for example.

The client 3 generates a request for acquiring the ID of the activity selected by the user, and transmits the request to the Web service 40 (SQ16).

Based on the request from the client 3, the Web service 40 calls up the workflow engine 53 (SQ17), thereby obtaining an activity ID (SQ18).

The Web service 40 generates a response indicative of the acquisition of the activity ID inclusive of the obtained activity ID, and transmits the response to the client 3 (SQ19).

Further, the user adds the document to the activity (SQ20) as illustrated as (2) in FIG. 14, for example.

The client 3 generates a request for adding a document inclusive of the activity ID and the document ID identifying the document, and transmits the request to the Web service 40 (SQ21).

Based on the request from the client 3, the Web service 40 calls up the document management unit 51 to register (or modify) the document (SQ22).

Further, the Web service 40 operating based on the request from the client 3 calls up the link engine 52 to add a record linking the activity and the document to each other in the link storing unit 71 or the like as shown in FIG. 16 (SQ23).

Further, the Web service 40 operating based on the request from the client 3 calls up the link engine 52 to add a record linking the document and the user ID of the creator of the document or the like to each other in the link storing unit 71 or the like as shown in FIG. 16 (SQ24).

The Web service 40 generates a response indicative of the addition of the document for transmission to the client 3 (SQ25).

As shown as (3) in FIG. 14, for example, the client 3 displays the added document in the document tree presented in the document view (SQ26).

Through the process as shown in FIG. 17, a document can be added in the workflow system, for example.

In the following, an example of a GUI relating to a search operation at the client 3 will be described with reference to FIG. 18. FIG. 18 is a drawing showing an example of a GUI relating to search operation for use at the client.

Using a GUI as shown in FIG. 18, the user searches for activities relating to documents that include the character string "request", for example.

Figure 19:
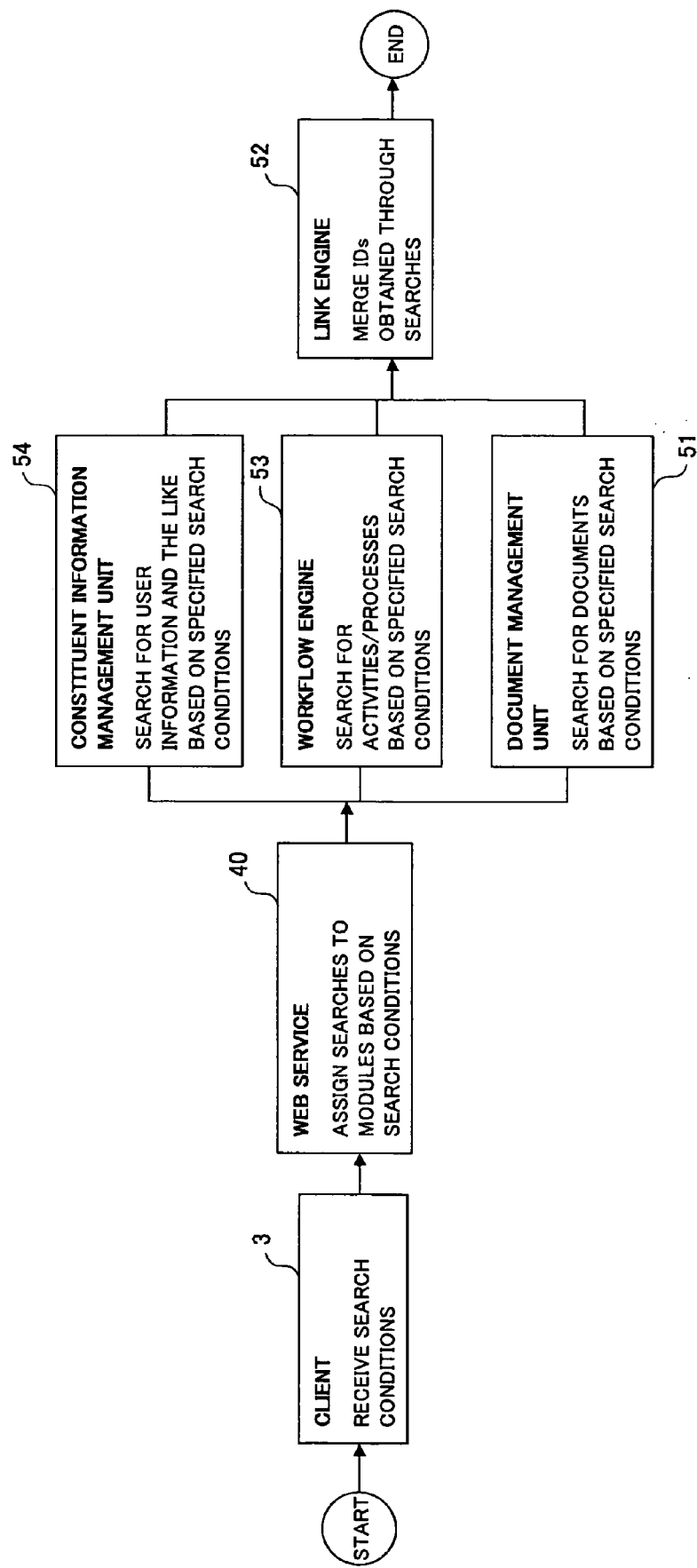
FIG. 19 is a flowchart showing an example of a search process conducted in the workflow system.

In what follows, the concept of a search in the workflow system will be described with reference to FIG. 19. FIG. 19 is a flowchart showing an example of a search process conducted in the workflow system.

Using a GUI as shown in FIG. 18, the client 3 receives search conditions from the user.

The Web service 40 assigns searches to respective modules based on the search conditions included in the search request transmitted from the client 3.

For example, the constituent information management unit 54 searches for user information or the like according to the specified search conditions. The workflow engine 53 searches for activities and/or processes according to the specified search conditions. The document management unit 51 searches for documents according to the specified search conditions.

The link engine 52 merges the search results obtained through the searches by the respective modules, and supplies the merged search results to the Web service 40.

The Web service 40 transmits the merges search results to the client 3.

Figure 20:
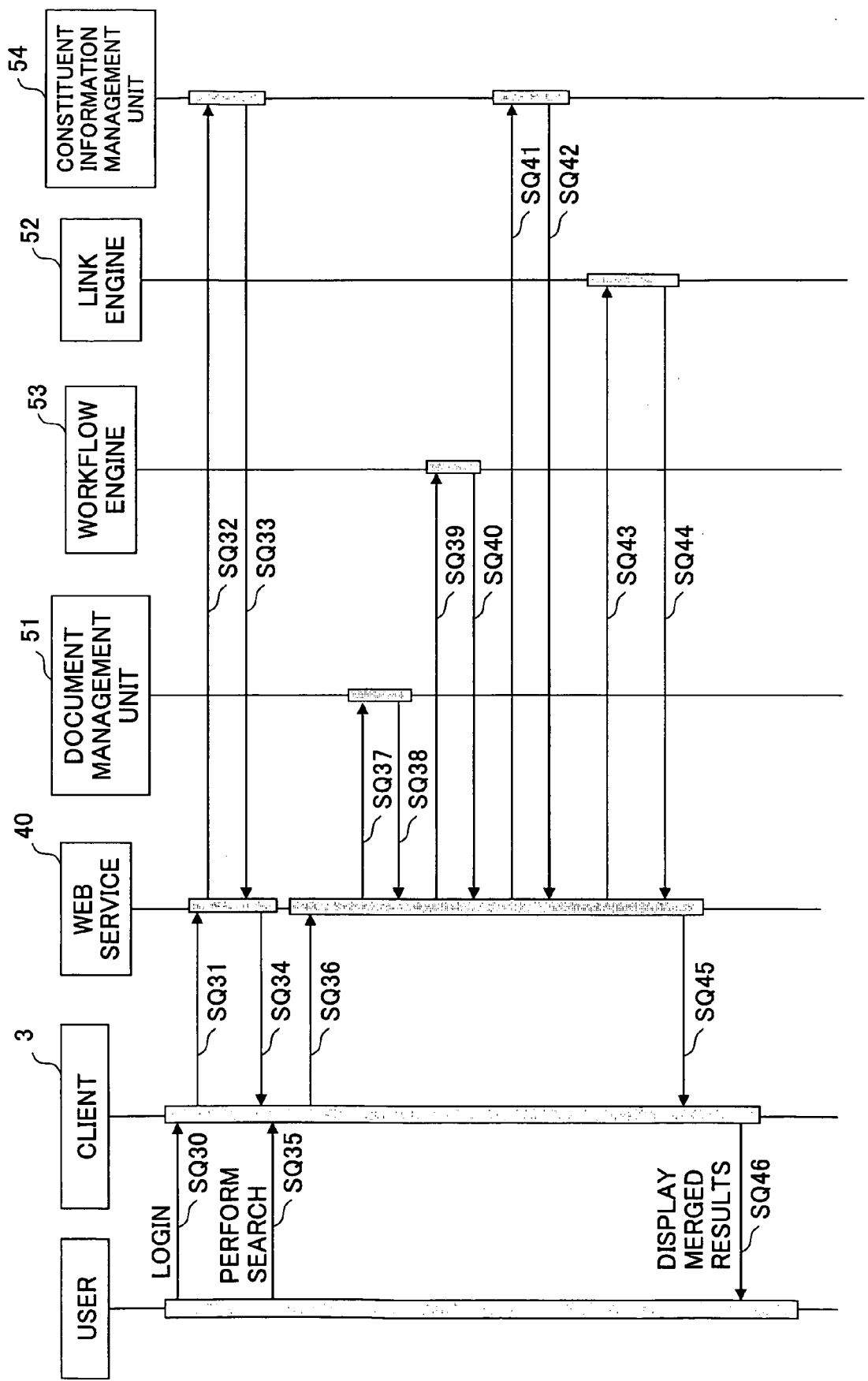
FIG. 20 is a sequence chart showing an example of a search process conducted in the workflow system.

In the following, an example of a search process conducted in the workflow system will be described with reference to FIG. 20. FIG. 20 is a sequence chart showing an example of a search process conducted in the workflow system.

The user enters the user name to login to the client 3 (SQ30).

The client 3 generates a request for acquiring a user ID inclusive of the user name or the like, and transmits the request to the Web service 40 (SQ31).

Based on the request from the client 3, the Web service 40 calls up the constituent information management unit 54 (SQ32), thereby obtaining a user ID (SQ33).

The Web service 40 generates a response indicative of the acquisition of the user ID inclusive of the obtained user ID, and transmits the response to the client 3 (SQ34).

Further, the user enters search conditions by using a GUI as shown in FIG. 18, thereby requesting a search (SQ35).

Upon receipt of the search request from the user, the client 3 transmits a search request inclusive of the search conditions to the Web service 40 (SQ36).

Based on the request from the client 3, the Web service 40 calls up the document management unit 51, for example, to request a search (SQ37), and obtains search results (SQ38).

Further, the Web service 40 operating based on the request from the client 3 calls up the workflow engine 53, for example, to request a search (SQ39), and obtains search results (SQ40).

Further, the Web service 40 operating based on the request from the client 3 calls up the constituent information management unit 54, for example, to request a search (SQ41), and obtains search results (SQ42).

The Web service 40 then calls up the link engine 52 by using the search results as parameters to request merging of the search results (SQ43), and obtains merged search results (SQ44).

The Web service 40 generates a response inclusive of the merged search results, and transmits the response to the client 3 (SQ45). The client 3 presents the merged search results to the user (SQ46).

By the process as shown in FIG. 20, provision is thus made to conduct a search.

In the following, an example of merging of search results will be described with reference to FIG. 21. FIG. 21 is a drawing for explaining the merging of search results.

Upon receiving the results of a document search and the results of an activity search from the Web service 40, the link engine 52 refers to link information, thereby generating a link for merged results as shown in FIG. 21.

In the following, an example of merged results generated based on the link for merged results will be described with reference to FIGS. 22A and 22B. FIGS. 22A and 22B are drawings showing merged results.

After generating the link for merged results as shown in FIG. 21, the link engine 52 generates merged search results as shown in FIG. 22A based on the link for merged results, the results of the document search, and the results of the activity search. The merged search results are then supplied to the client 3 via the Web service 40.

Based on the merged search results, the client 3 generates a table as shown in FIG. 22B. This table may be presented to the user on the display screen, and/or may be stored as a document.

In the following, another example of a GUI relating to a search operation for use at the client 3 will be described with reference to FIG. 23. FIG. 23 is a drawing showing a GUI relating to search operation for use at the client.

In the example of FIG. 23, a search is conducted to find documents including the character string "specification" in their titles among the documents relating to the activities performed up to Oct. 10, 2004.

In the following, a description will be given of, with reference to FIGS. 24A and 24B, an example of merged results generated by the link engine 52 as a result of a search conducted according to the search conditions shown in FIG. 23. FIGS. 24A and 24B are drawings showing merged results.

The link engine 52 generates merged search results as shown in FIG. 24A, and supplies the merged search results to the client 3 via the Web service 40.

Based on the merged search results, the client 3 generates a table as shown in FIG. 24B. This table may be presented on the display screen to the user, and/or may be stored as a document.

In the following, another example of a GUI relating to search operation for use at the client 3 will be described with reference to FIG. 25. FIG. 25 is a drawing showing a GUI relating to search operation for use at the client.

In the example of FIG. 25, a search is conducted to find activities that relate to people of "Development" in terms of organization, and that relate to the documents including the character string "specification" in their titles.

In the following, another example of merging of search results will be described with reference to FIG. 26. FIG. 26 is a drawing for explaining the merging of search results.

Upon receiving the results of a document search, the results of an activity search, and the results of an organization search from the Web service 40, the link engine 52 refers to link information, thereby generating a link for merged results as shown in FIG. 26.

In the following, an example of merged results generated based on the link for merged results shown in FIG. 26 will be described with reference to FIGS. 27A and 27B. FIGS. 27A and 27B are drawings showing merged results.

After generating the link for merged results as shown in FIG. 26, the link engine 52 generates merged search results as shown in FIG. 27A based on the link for merged results, the results of the document search, the results of the activity search, and the results of the organization search. The merged search results are then supplied to the client 3 via the Web service 40.

Based on the merged search results, the client 3 generates a table as shown in FIG. 27B. This table may be presented to the user on the display screen, and/or may be stored as a document.

Figure 28:
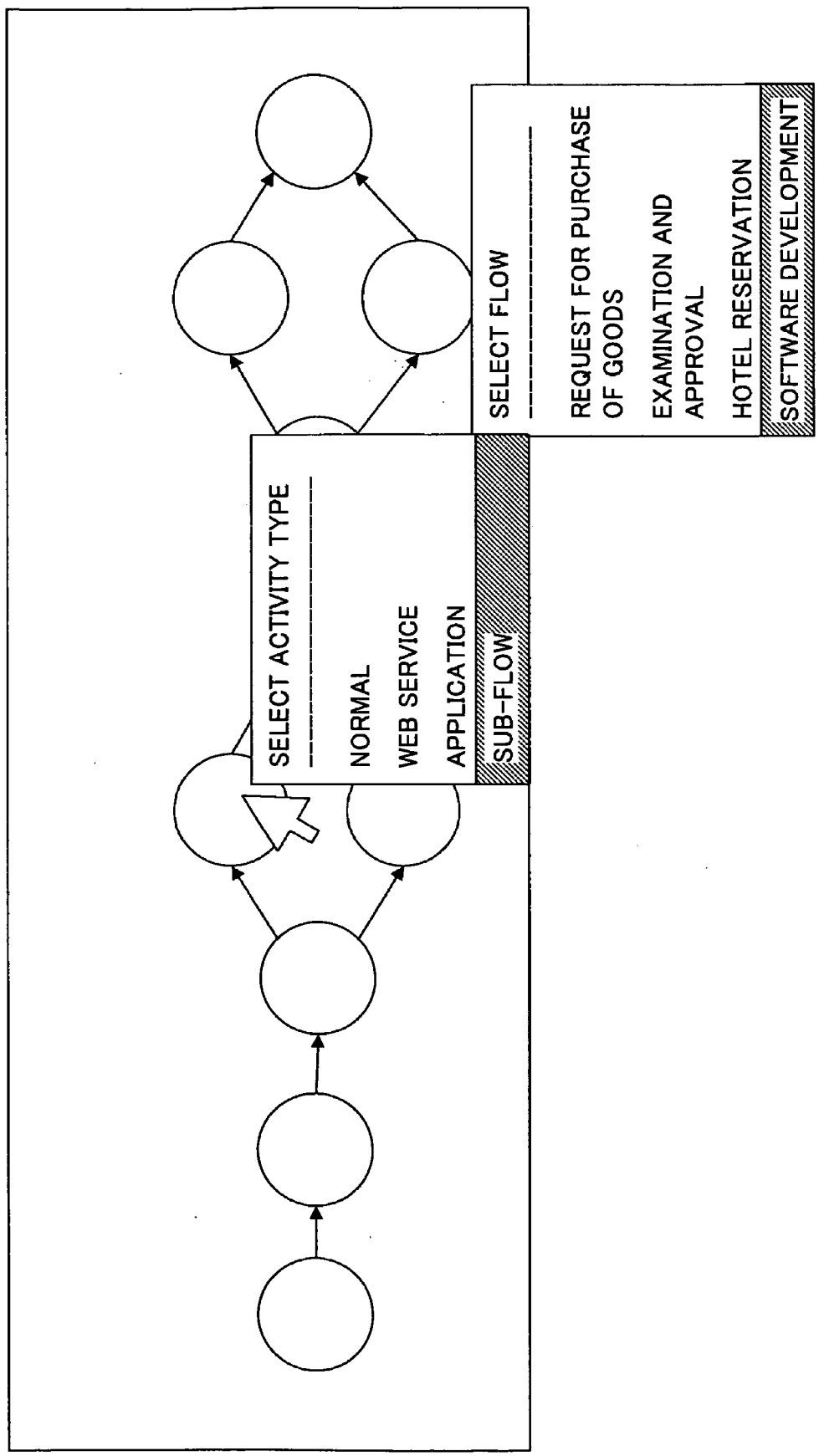
FIG. 28 is a drawing showing a GUI relating to sub-flow registration for use at the client.

In the following, an example of a GUI relating to sub-flow registration at the client 3 will be described with reference to FIG. 28. FIG. 28 is a drawing showing a GUI relating to sub-flow registration for use at the client.

When specifying a process definition, for example, the user may select a sub-flow for a given activity on the process view where the sub-flow is one of the types that can be defined for the activities constituting the process as shown in FIG. 28. From the flows that are already defined, a flow to be linked to the activity is then selected.

Figure 29:
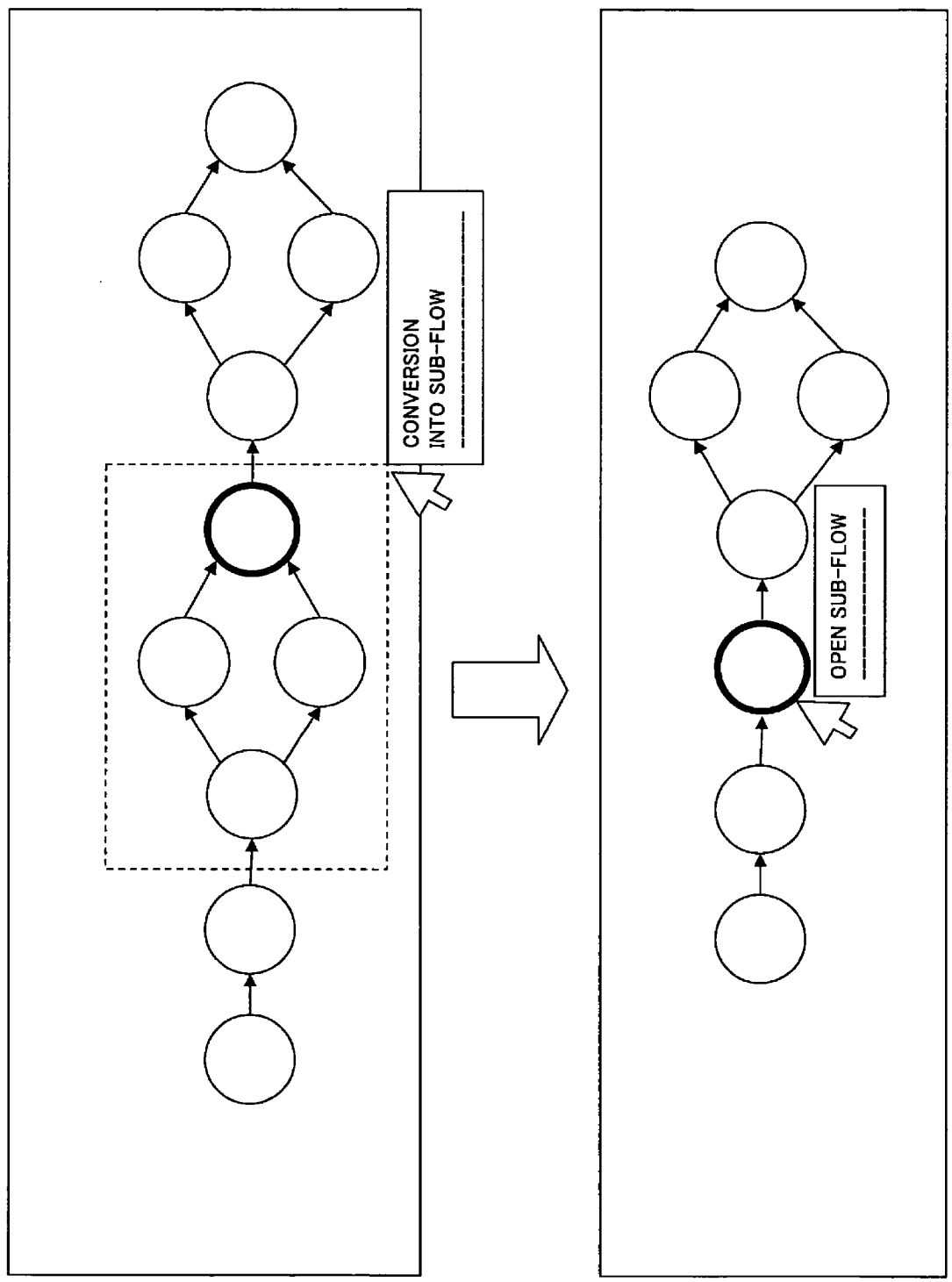
FIG. 29 is a drawing showing a GUI relating to sub-flow registration for use at the client.

In the flowing, another example of a GUI relating to sub-flow registration for use at the client 3 will be described with reference to FIG. 29. FIG. 29 is a drawing showing a GUI relating to sub-flow registration for use at the client.

While the process is being performed, for example, the user selects activities on the process view as shown in FIG. 29 for the purpose of turning the activities into a sub-flow. With this, some of the activities constituting the process are changed into a sub-flow.

In the following, an example of a process relating to sub-flow registration performed by the link engine 52 will be described with reference to FIG. 30. FIG. 30 is a drawing for explaining an example of a process relating to sub-flow registration performed by the link engine.

A record corresponding to ID5 in FIG. 30 is an example of a record that is added to the link storing unit 71 when a sub-flow is registered.

In the following, another example of a GUI relating to search operation for use at the client 3 will be described with reference to FIG. 31. FIG. 31 is a drawing showing a GUI relating to search operation for use at the client.

In the example of FIG. 31, a search is conducted to find activities that relate to people of "Development" in terms of organization, and that relate to the documents including the character string "specification" in their titles. This search is conducted by including sub-flows as the place to be searched.

In the following, another example of merging of search results will be described with reference to FIG. 32. FIG. 32 is a drawing for explaining the merging of search results.

Upon receiving the results of a document search, the results of an activity search, and the results of an organization search from the Web service 40, the link engine 52 refers to link information, thereby generating a link for merged results as shown in FIG. 32.

Here, the link engine 52 refers to the link information to check whether the activities included in the results of the activity search have links to processes.

There may be an activity linked to a process among the activities included in the results of the activity search such as the record ID5 in the link information. In such a case, the link engine 52 adds links relating to the linked process (e.g., a record corresponding to ID6 in the link information) to the link for merged results in the same manner as adding the results of the activity search.

In the following, an example of merged results generated based on the link for merged results shown in FIG. 32 will be described with reference to FIGS. 33A and 33B. FIGS. 33A and 33B are drawings showing merged results.

After generating the link for merged results as shown in FIG. 32, the link engine 52 generates merged search results as shown in FIG. 33A based on the link for merged results, the results of the document search, the results of the activity search, and the results of the organization search. The merged search results are then supplied to the client 3 via the Web service 40.

Based on the merged search results, the client 3 generates a table as shown in FIG. 33B. This table may be presented to the user on the display screen, and/or may be stored as a document.

Figure 34:
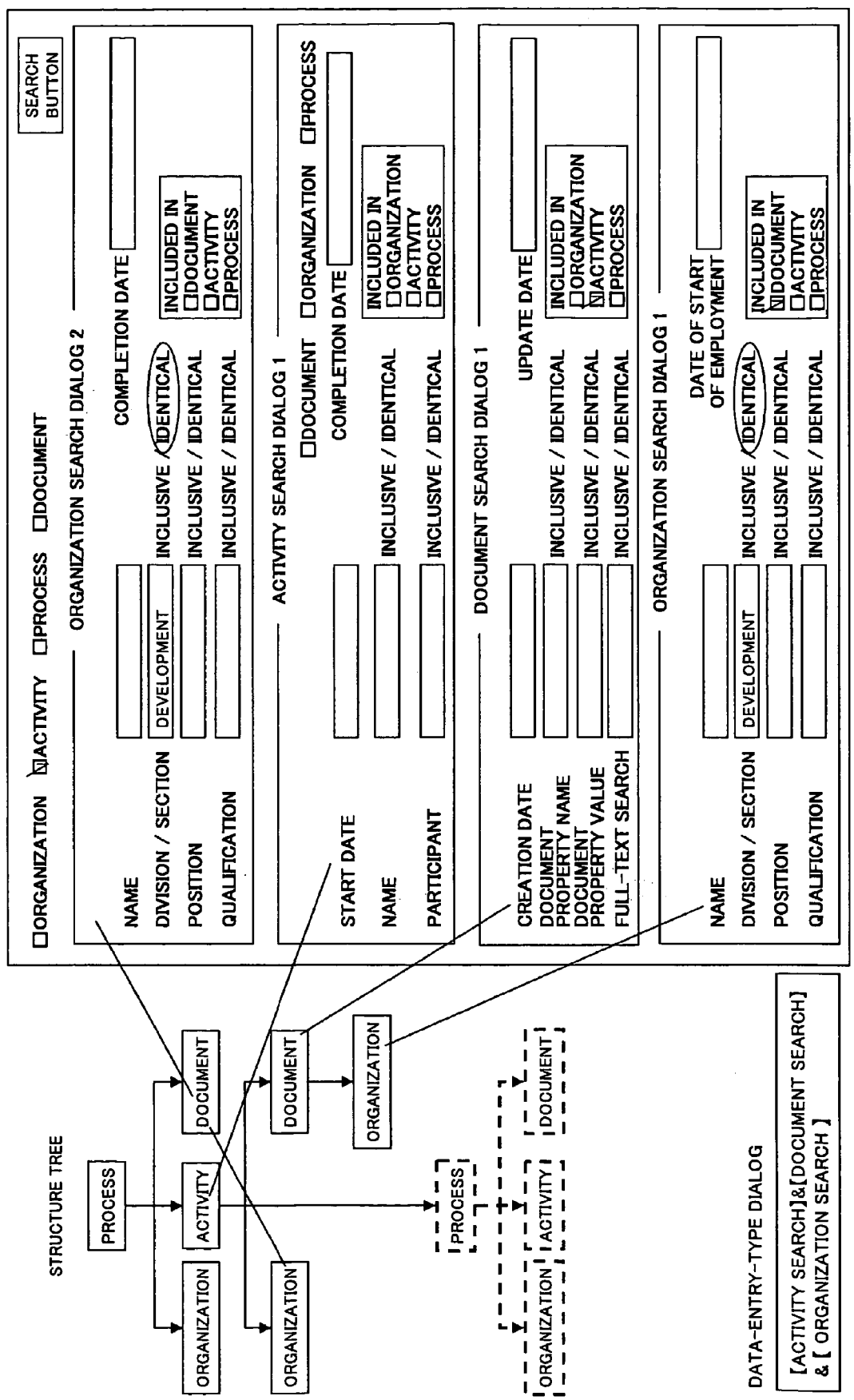
FIG. 34 is a drawing showing a GUI relating to search operation for use at the client.

In the following, another example of a GUI relating to search operation for use at the client 3 will be described with reference to FIG. 34. FIG. 34 is a drawing showing a GUI relating to search operation for use at the client.

As shown in FIG. 34, the client 3 can display a tree which represents activities constituting a process, documents, and organizations based on the link information about the process, activities, documents, and organizations obtained from the server 1. The user selects nodes in the tree as illustrated in FIG. 34, and enters search conditions to conduct a search. A more detailed search can thus be conducted.

Figure 35B:
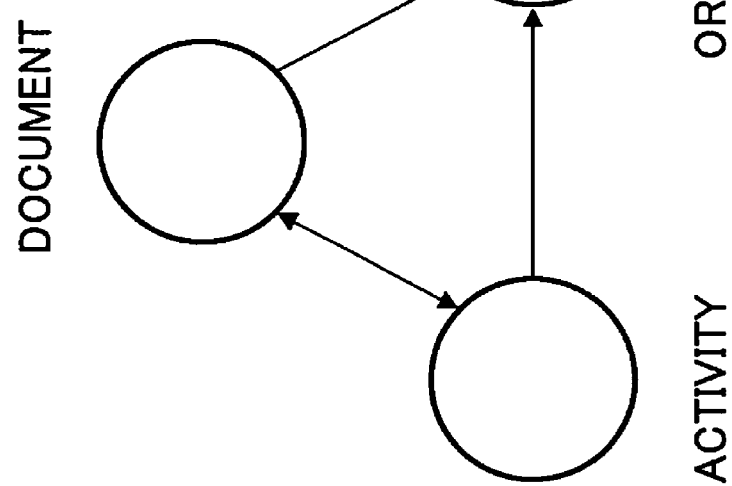
FIGS. 35A and 35B are drawings showing an example of addition of a link by the link engine.
Figure 35A:
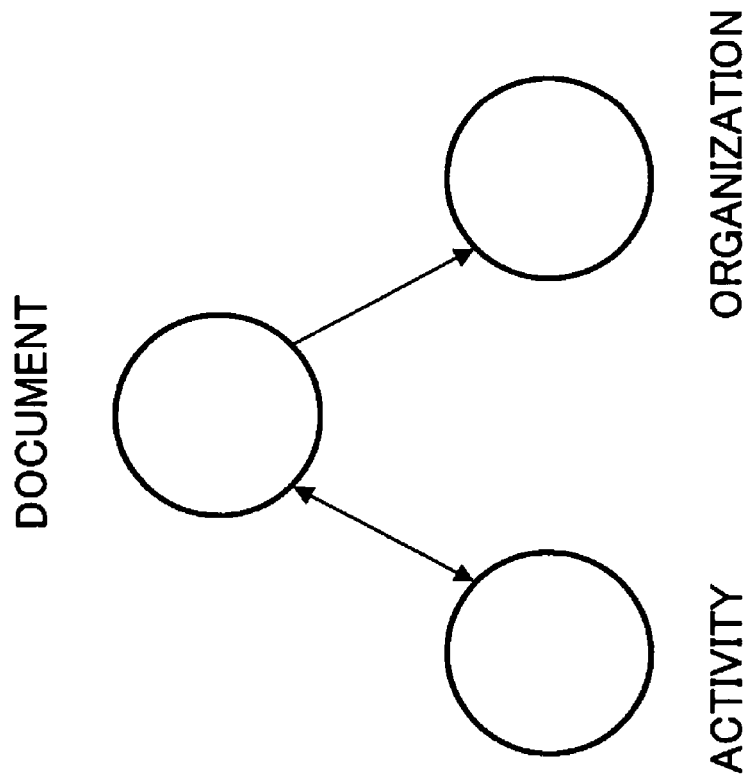

In the following, an example of addition of a link by the link engine 52 will be described with reference to FIGS. 35A and 35B. FIGS. 35A and 35B are drawings showing an example of addition of a link by the link engine.

When there is a link relation as shown in FIG. 35A, the link engine 52 generates a link extending from an activity to an organization as shown in FIG. 35B, thereby performing the addition of a link.

Figure 39:
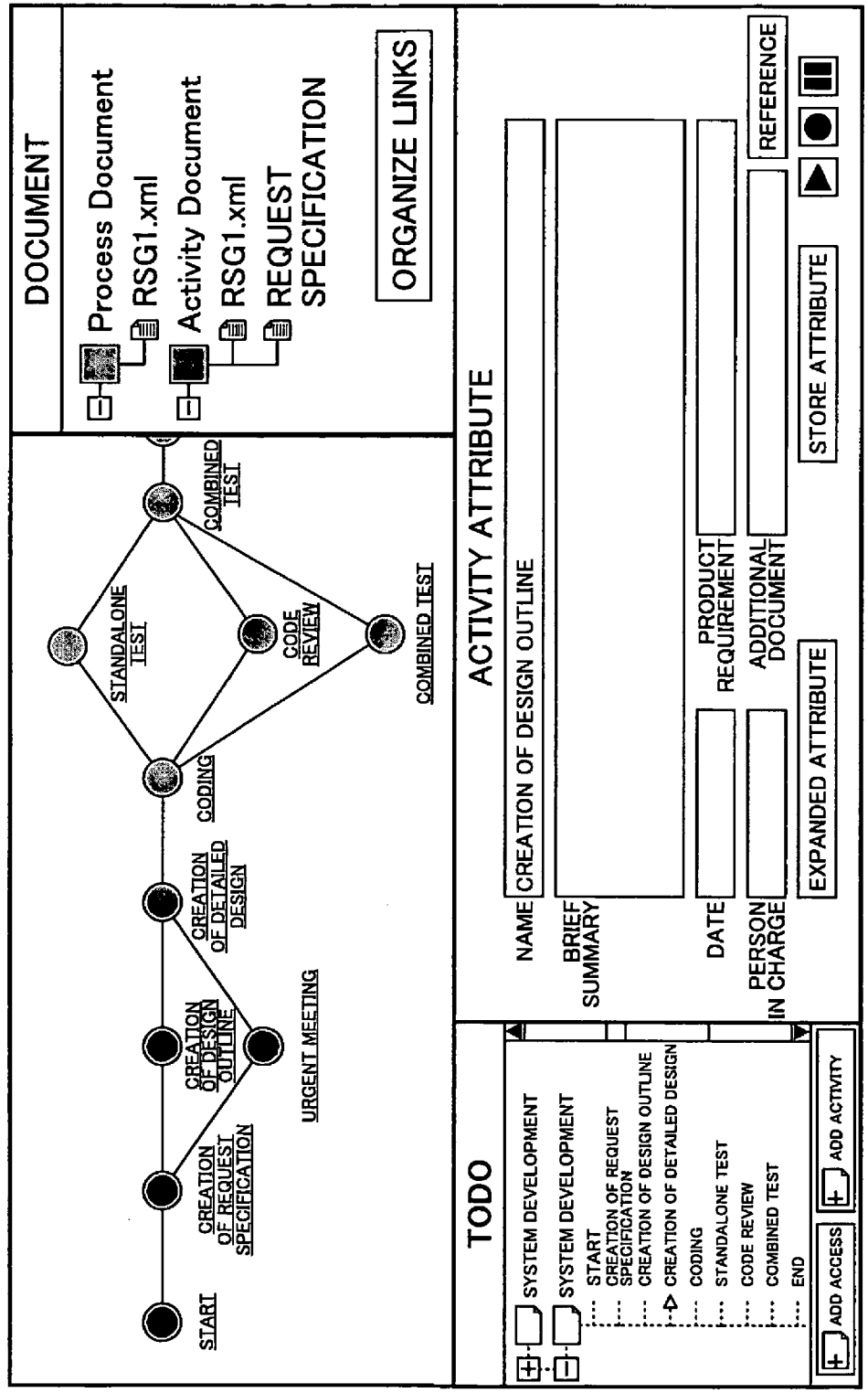
FIG. 39 is a drawing showing a GUI relating to linking operation for use at the client.

The addition of a link may be performed at predetermined intervals such as 30 minutes by the link engine 52 referring to the link information, or may be performed in response to a request from a client as illustrated in FIG. 39, which will be later described.

In the following, an example of the link information obtained by the addition of a link will be described with reference to FIG. 36. FIG. 36 is a drawing showing an example of the link information obtained by the addition of a link.

As shown in FIG. 36, the link engine 52 adds new records (e.g., a record of ID6 and a record of ID7) to the link information in respect of the addition of a link. Further, when adding a new record to the link information, the link engine 52 stores the ID of a consulted record as a Ref item to indicate which link information item was consulted when adding this new record.

Figure 37B:
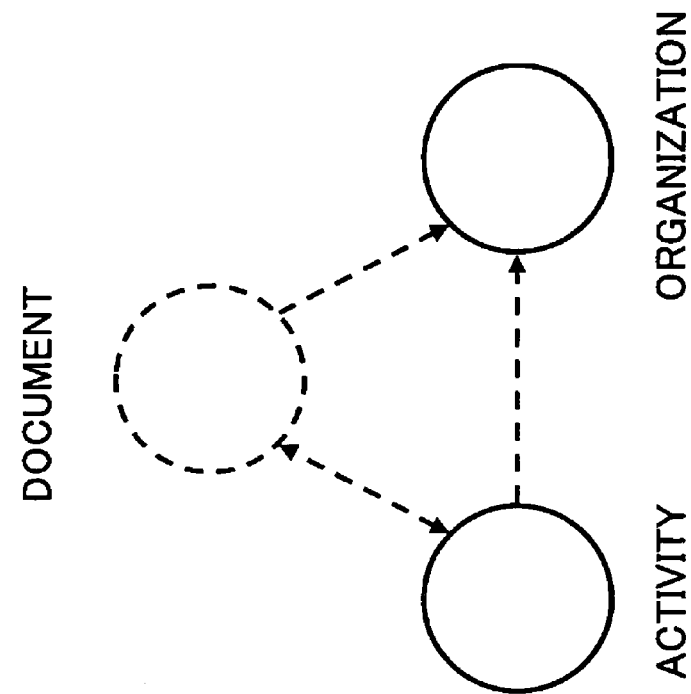
FIGS. 37A and 37B are drawings showing an example of removal of a link by the link engine.
Figure 37A:
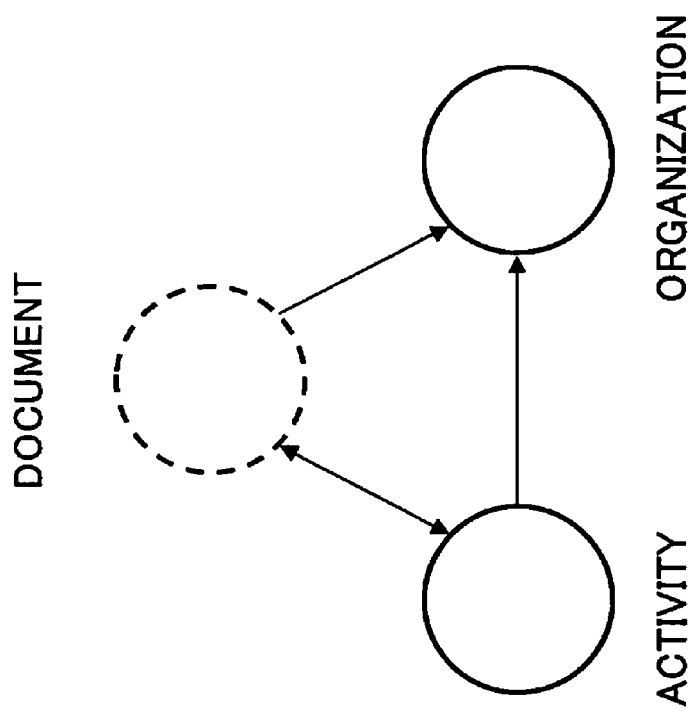

In the following, an example of removal of a link by the link engine 52 will be described with reference to FIGS. 37A and 37B. FIGS. 37A and 37B are drawings showing an example of removal of a link by the link engine.

When a referenced item is removed in response to a request from a user or the like as shown in FIG. 37A, the link engine 52 removes links that were added based on the link information relating to the referenced item (FIG. 37B).

Figure 38B:
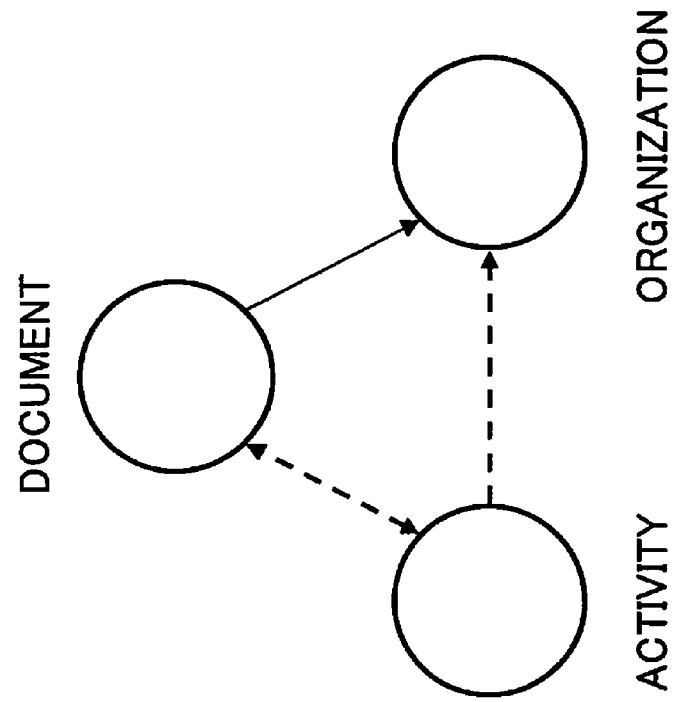
FIGS. 38A and 38B are drawings showing an example of removal of a link by the link engine.
Figure 38A:
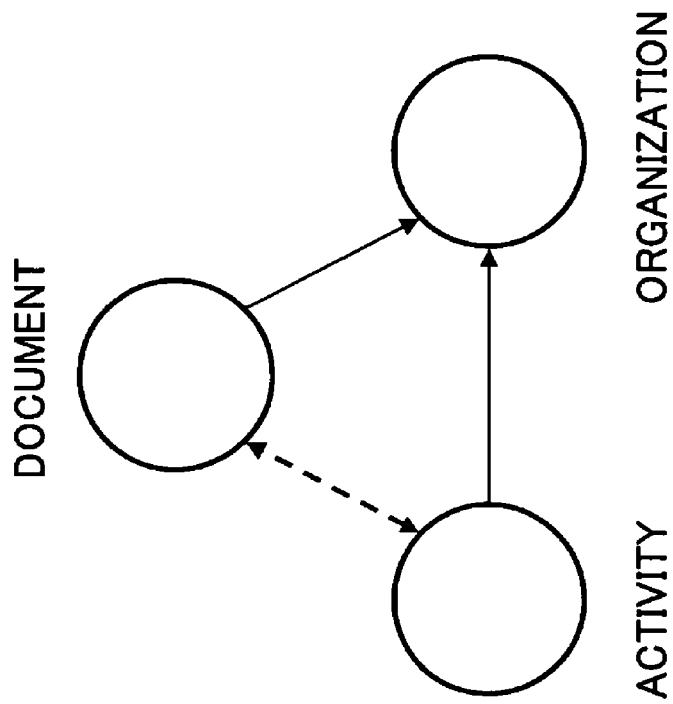

In the following, another example of removal of a link by the link engine 52 will be described with reference to FIGS. 38A and 38B. FIGS. 38A and 38B are drawings showing an example of removal of a link by the link engine.

When a link is no longer in existence as shown in FIG. 38A, the link engine 52 removes a link that was added based on this link (FIG. 38B).

In the following, an example of a GUI relating to linking operation for use at the client 3 will be described with reference to FIG. 39. FIG. 39 is a drawing showing a GUI relating to linking operation for use at the client.

As shown in FIG. 39, the user clicks a link organizing button shown in the document view, for example, thereby requesting a process to be performed to organize links such as adding or removing links as shown in FIGS. 35A and 35B through FIGS. 38A and 38B.

As the user clicks the link organizing button, the client 3 transmits a request for organizing links to the Web service 40. In response to the request from the client 3, the Web service 40 calls up the link engine 52 to request the organizing of links. Receiving the request for the organizing of links, the link engine 52 performs addition of links or removal of links so as to reorganize the links.

Figure 40:
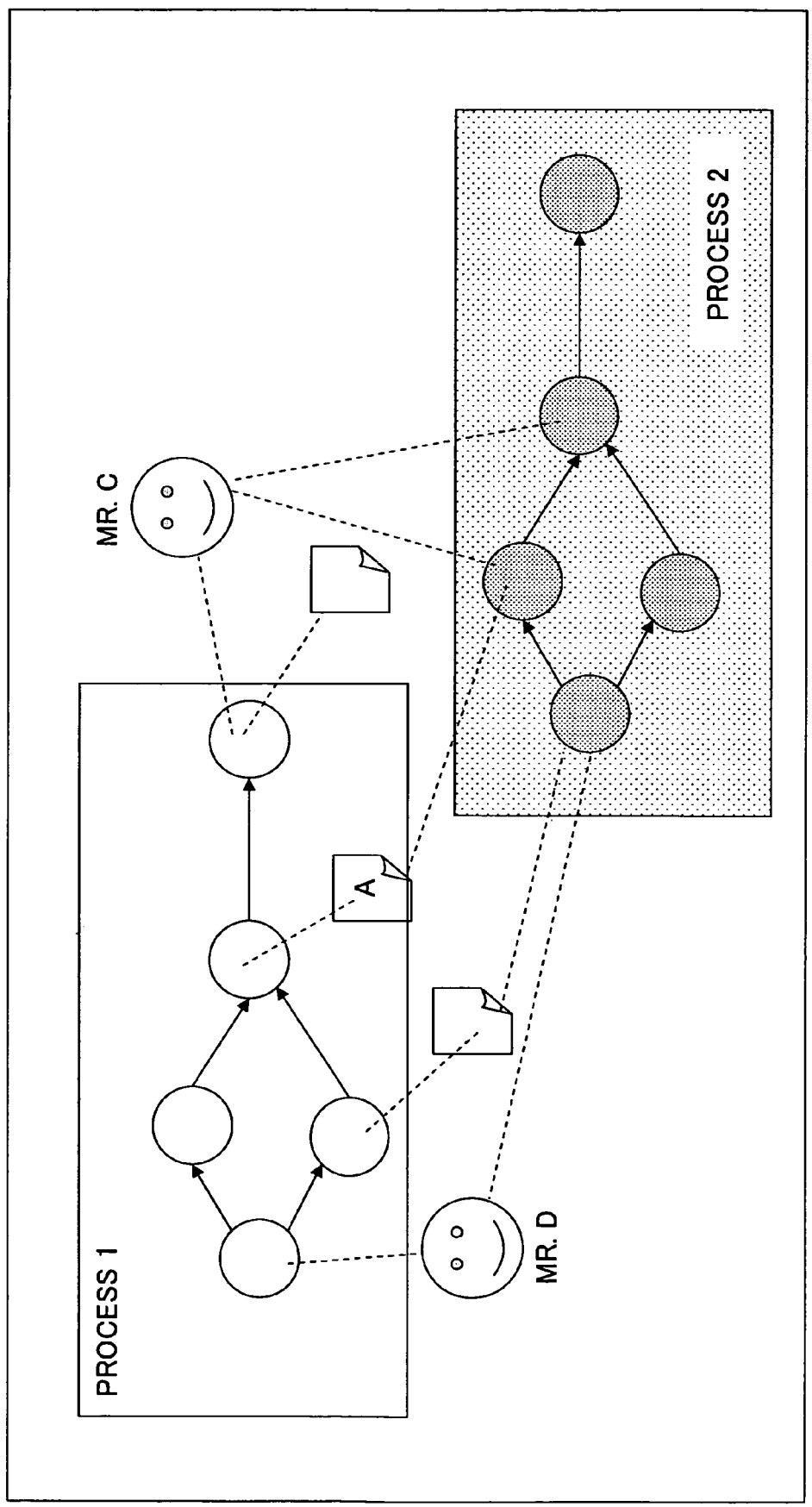
FIG. 40 is a drawing showing an example of a GUI relating to search results for use at the client.

In the following, an example of a GUI relating to search results for use at the client 3 will be described with reference to FIG. 40. FIG. 40 is a drawing showing an example of a GUI relating to search results for use at the client 3.

A user may request a search for activities relating to a document A by specifying the document A as a query key by use of a GUI relating to search operation as previously described. In such a case, the client 3 transmits a request for searching for activities using the document A as a query key (i.e., search conditions) to the server 1, and then receives a search response inclusive of the results of the search from the server 1.

Based on the search response inclusive of the results of the search received from the server 1, the client 3 graphically displays activities relating to the document A, a process including those activities, documents relating to the process or the activities constituting the process, user information relating to the process or the activities constituting the process, as illustrated in FIG. 40. Objects such as activities, documents, and user information as shown in FIG. 40 are presented on the display screen in such a fashion as to be operable through drag & drop operations specified by the input unit 31 of the client 3.

In the following, another example of a GUI relating to search operation for use at the client 3 will be described with reference to FIG. 41. FIG. 41 is a drawing showing a GUI relating to search operation for use at the client.

The GUI relating to search operation illustrated in FIG. 41 differs from the GUIs relating to search operations previously described in that this GUI includes a ranking display check box allowing a user to select whether to display a ranking.

When the user checks the ranking display check box and clicks the search button, the client 3 transmits a search request inclusive of search conditions entered by the user and information indicative of the checked status of the ranking display check box.

In the following, an example of link information will be described with reference to FIG. 42. FIG. 42 is a drawing showing an example of link information.

The link engine 52 may receive, from the Web service 40 or the like, information indicative of the checked status of the ranking display check box as shown in FIG. 41. In such a case, the link engine 52 receives the results of a document search and the results of an activity search, for example, and refers to link information to generate a link for merged results. In doing so, the link engine 52 ranks objects such that the larger the number of registered links in the link information for a given object (e.g., document), the higher the ranking for this object will be. Here, the higher the ranking of an object, the more frequent the use of the object. Then, a link for merged results is generated as a list in which the ranked objects are arranged in a descending order of rankings.

After generating the link for merged results, the link engine 52 generates merged search results based on the link for merged results, the results of a document search, the results of an activity search, etc. The merged search results are then supplied to the client 3 via the Web service 40.

In the following, another example of a GUI relating to search results for use at the client 3 will be described with reference to FIG. 43. FIG. 43 is a drawing showing a GUI relating to search results for use at the client.

The client 3 receives merged search results with rankings from the server 1. The client 3 then displays the merged search results with rankings as shown in FIG. 43.

As described above, the workflow of the present invention provides for documents and constituent information to be used at a system without copying thereof from another system even when the document management unit 51 and the constituent information management unit 54 are provided in such another system, and even when the documents and constituent information are being used in such another system. When modification is made to the documents and constituent information in such another system, further, the workflow of the present invention can flexibly cope with such modification.

As described above, further, the present invention provides for an efficient, high-speed search to be conducted to find processes, activities, documents, constituent information items, etc., related to each other.

Further, the present invention is not limited to these embodiments, but various variations and modifications may be made without departing from the scope of the present invention.

The present application is based on Japanese priority application No. 2004-056516 filed on Mar. 1, 2004, with the Japanese Patent Office, the entire contents of which are hereby incorporated by reference.

What is claimed is:

1. A hardware apparatus for managing one or more processes, comprising:
    a processor;
    a reference relation information managing unit configured to manage and create information about reference relations between the one or more processes, one or more activities constituting the one or more processes, and one or more documents relating to at least one of the one or more processes and the one or more activities, and to manage and create information about reference relations between the one or more processes, the one or more activities, and one or more participants relating to at least one of the one or more processes and the one or more activities;
    a search unit configured to search for the one or more processes, the one or more activities, the one or more documents, and the one or more participants related to each other by the information about reference relations created by said reference relation information managing unit, in response to a search request inclusive of a search condition that is information about at least one of the one or more processes, the one or more activities, the one or more documents, and the one or more participants;
    a linking unit configured to link and associate a document with the one or more activities associated with the one or more processes, when a document is added to the one or more activities, and the linking unit is further configured to store links with respect to the one or more activities associated with the one or more processes and the one or more documents; and
    a merge unit configured to merge results of a search conducted by said search unit based on the information about reference relations managed by said reference relation information managing unit.

2. The apparatus as claimed in claim 1 wherein said search unit is configured to include one or more sub-flows of the one or more processes as an item to be searched for upon request for such search.

3. A system, comprising:
    a hardware apparatus for managing one or more processes, including
        a processor,
        a reference relation information managing unit configured to manage and create information about reference relations between the one or more processes, one or more activities constituting the one or more processes, and one or more documents relating to at least one of the one or more processes and the one or more activities, and to manage and create information about reference relations between the one or more processes, the one or more activities, and one or more participants relating to at least one of the one or more processes and the one or more activities,
        a search unit configured to search for the one or more processes, the one or more activities, the one or more documents, and the one or more participants related to each other by the information about reference relations created by said reference relation information managing unit, in response to a search request inclusive of a search condition that is information about at least one of the one or more processes, the one or more activities, the one or more documents, and the one or more participants,
        a linking unit configured to link and associate a document with the one or more activities associated with the one or more processes, when a document is added to the one or more activities, and the linking unit is further configured to store links with respect to the one or more activities associated with the one or more processes and the one or more documents, and
        a merge unit configured to merge results of a search conducted by said search unit based on the information about reference relations managed by said reference relation information managing unit; and
    a user terminal apparatus configured to be coupled to the hardware apparatus through a network, the user terminal apparatus including
        a search screen displaying unit configured to display a search screen configured to receive information about at least one of the one or more processes, the one or more activities, the one or more documents, and the one or more participants as a search condition.

4. The system as claimed in claim 3, wherein the search screen is configured to display a tree structure representing at least one of the one or more processes, the one or more activities, the one or more documents, and the one or more participants.

5. The system as claimed in claim 3, the user terminal apparatus further comprising:
a search result screen displaying unit configured to display a screen for showing merged search results.

6. The system as claimed in claim 3, the user terminal apparatus further comprising:
a document registering screen displaying unit configured to display a screen for registering a document.

7. The system as claimed in claim 3, the user terminal apparatus further comprising:
a sub-flow registering screen displaying unit configured to display a screen for registering a sub-flow of the one or more processes.

8. The system as claimed in claim 3, wherein the sub-flow is displayed as one element, and the sub-flow can be expanded.

9. The system as claimed in claim 3, wherein one or more sub-flows can be searched if a user selects an option, indicating that sub-flows are included in searching, in a graphical user interface.

10. A computer-readable storage medium having a program embodied therein for causing a computer to manage one or more processes, said program causing the computer to perform a method comprising:
managing and creating information about reference relations between the one or more processes, one or more activities constituting the one or more processes, and one or more documents relating to at least one of the one or more processes and the one or more activities, and to manage and create information about reference relations between the one or more processes, the one or more activities, and one or more participants relating to at least one of the one or more processes and the one or more activities;
searching for at least one of the one or more processes, the one or more activities, the one or more documents, and the one or more participants related to each other by the information about reference relations, in response to a search request inclusive of a search condition that is information about at least one of the one or more processes, the one or more activities, the one or more documents, and the one or more participants;
linking and associating a document with the one or more activities associated with the one or more processes, when a document is added to the one or more activities, and storing links with respect to the one or more activities associated with the one or more processes and the one or more documents; and
merging results of a search conducted by said searching based on the information about reference relations managed by said managing.

11. The computer-readable storage medium as claimed in claim 10 wherein said searching includes one or more sub-flows of the one or more processes as an item to be searched for upon request for such search.

12. A computer-readable storage medium as claimed in claim 10, wherein the program causes the computer to display a search screen operable to receive information about at least one of the one or more processes, the one or more activities, the one or more documents, and the one or more participants as a search condition.

13. The computer-readable storage medium as claimed in claim 12, wherein the search screen is configured to display a tree structure representing at least one of the one or more processes, the one or more activities, the one or more documents, and the one or more participants.

14. The computer-readable storage medium as claimed in claim 12, wherein the program is further operable to cause the computer to function as a search result screen displaying unit configured to display a screen for showing merged search results.

15. The computer-readable storage medium as claimed in claim 12, wherein the program is further operable to cause the computer to function as a document registering screen displaying unit configured to display a screen for registering a document.

16. The computer-readable storage medium as claimed in claim 12, wherein the program is further operable to cause the computer to function as a sub-flow registering screen displaying unit configured to display a screen for registering a sub-flow of the one or more processes.

17. A method of managing one or more processes in a process management apparatus, comprising:
managing information about reference relations between the one or more processes, one or more activities constituting the one or more processes, and one or more documents relating to at least one of the one or more processes and the one or more activities, and to manage and create information about reference relations between the one or more processes, the one or more activities, and one or more participants relating to at least one of the one or more processes and the one or more activities;
searching for at least one of the one or more processes, the one or more activities, the one or more documents, and the one or more participants related to each other by the information about reference relations, in response to a search request inclusive of a search condition that is information about at least one of the one or more processes, the one or more activities, the one or more documents, and the one or more participants;
linking and associating a document with the one or more activities associated with the one or more processes, when a document is added to the one or more activities, and storing links with respect to the one or more activities associated with the one or more processes and the one or more documents; and
merging results of a search conducted by said searching based on the information about reference relations managed by said managing.

18. A method of conducting a search in a user terminal apparatus connected to the process management apparatus of claim 17 through a network, comprising:
displaying a search screen operable to receive information about at least one of the one or more processes, the one or more activities, the one or more documents, and the one or more participants as a search condition.

* * * * *